United States Patent
Pool, III et al.

(10) Patent No.: US 12,471,733 B2
(45) Date of Patent: *Nov. 18, 2025

(54) TRAY ASSEMBLY

(71) Applicant: CookTek Induction Systems, LLC, Chicago, IL (US)

(72) Inventors: James Kelly Pool, III, Frisco, TX (US); Peter Jerome Ashcraft, McKinney, TX (US)

(73) Assignee: CookTek Induction Systems, LLC, Chicago, IL (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/453,021

(22) Filed: Aug. 21, 2023

(65) Prior Publication Data
US 2024/0148179 A1    May 9, 2024

Related U.S. Application Data

(63) Continuation of application No. 16/454,505, filed on Jun. 27, 2019, now Pat. No. 11,730,303.

(51) Int. Cl.
*A47J 29/02*    (2006.01)
*A47J 36/38*    (2006.01)
*A47J 37/01*    (2006.01)
*A47J 37/10*    (2006.01)
A47J 37/08     (2006.01)

(52) U.S. Cl.
CPC ............... *A47J 29/02* (2013.01); *A47J 36/38* (2013.01); *A47J 37/01* (2013.01); *A47J 37/108* (2013.01); *A47J 37/0871* (2013.01)

(58) Field of Classification Search
CPC .. A47J 9/007; A47J 29/02; A47J 29/06; A47J 37/0694; A47J 37/0871; A47J 37/0885; A47J 37/108; A21B 3/133; A21B 3/132; A21B 3/134; A21B 5/02; A21B 5/023
USPC ................... 99/426, 440, 428, 448
See application file for complete search history.

(56) References Cited

U.S. PATENT DOCUMENTS 2,397,410 A * 3/1946 Deacon ............... A47J 37/1295
                                                    99/410
3,831,508 A   8/1974 Wallard
4,908,487 A   3/1990 Sarnoff
(Continued)

FOREIGN PATENT DOCUMENTS

CA      2829726 A1 * 4/2015 ............. A21B 3/132
DE      29619872 U1    3/1998
(Continued)

OTHER PUBLICATIONS

United States Patent Office Action for U.S. Appl. No. 16/454,505 dated for Mar. 25, 2022 (1 page).

*Primary Examiner* — Reginald Alexander
(74) *Attorney, Agent, or Firm* — Michael Best & Friedrich LLP

(57) ABSTRACT

A tray assembly includes a tray having a top side, an underside opposite the top side, and a plurality of protrusions extending from the underside. Each protrusion defines a recess in the top side and has a bottom wall and a contoured surface connecting the bottom wall to the top side. The tray assembly also includes a diffuser in the form of a plate with a plurality of apertures therethrough. The diffuser is couplable to the tray and positionable a spaced distance above the top side of the tray.

15 Claims, 20 Drawing Sheets

(56) References Cited

U.S. PATENT DOCUMENTS

| | | | |
|---|---|---|---|
| 2003/0217646 A1* | 11/2003 | Tingley | A21B 3/132 |
| | | | 99/426 |
| 2009/0123625 A1 | 5/2009 | Shannon | |
| 2015/0289521 A1* | 10/2015 | van Aswegen | A21B 3/132 |
| | | | 99/426 |
| 2016/0029845 A1 | 2/2016 | Seitz | |

FOREIGN PATENT DOCUMENTS

| | | |
|---|---|---|
| GB | 2269985 A | 3/1994 |
| GB | 2455872 A | 6/2009 |
| WO | 2017079807 A1 | 5/2017 |

* cited by examiner

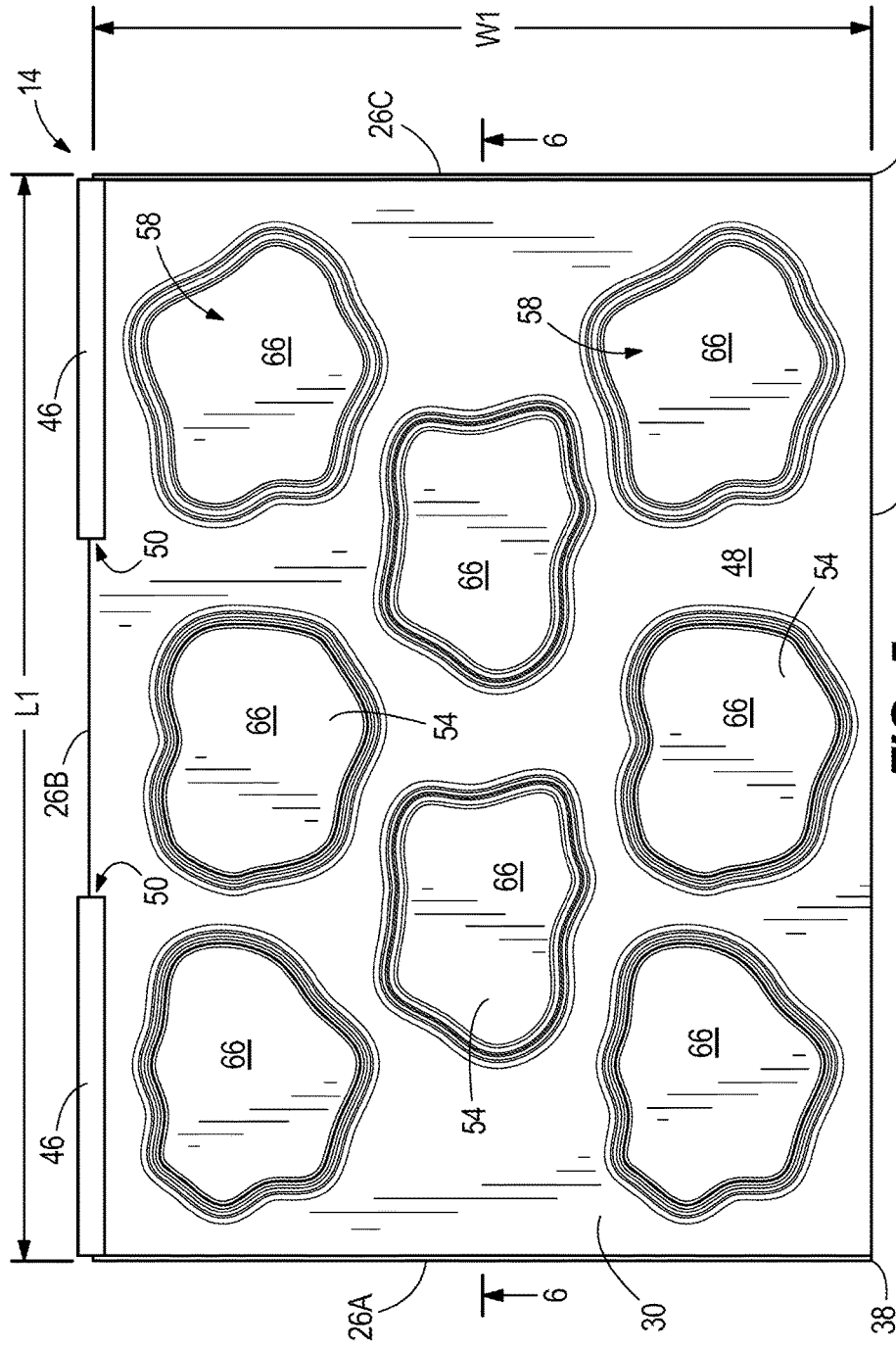
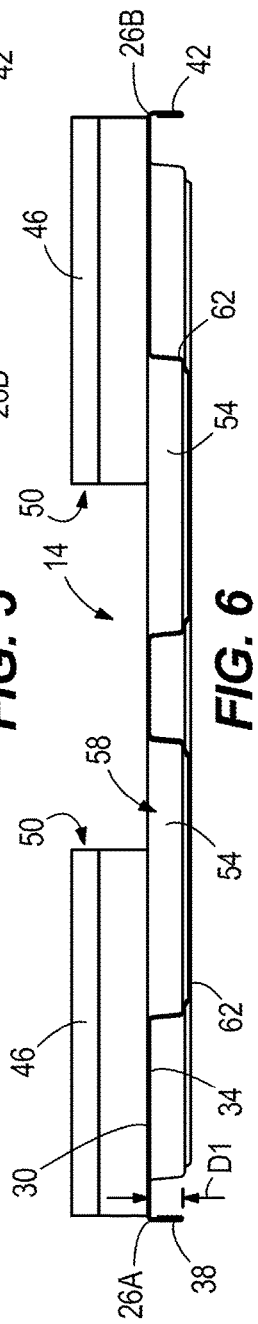
FIG. 5
FIG. 6

TRAY ASSEMBLY

BACKGROUND

The present disclosure relates to a tray assembly and in particular to a tray assembly for cooking eggs.

Impingement ovens (and convection ovens) employ air movement to heat up or cook food in a contained space, and hot air is typically circulated around or orthogonally onto the food to distribute heat evenly. Eggs in particular are sensitive to cooking conditions, and the physical appearance and consistency of an egg can be greatly affected by the distribution of hot air throughout the cooking process, especially when accelerated cooking technologies are used.

SUMMARY

In one embodiment, a tray assembly includes a tray having a top side, an underside opposite the top side, and a plurality of protrusions extending from the underside. Each protrusion defines a recess in the top side and has a bottom wall and a contoured surface connecting the bottom wall to the top side. The tray assembly also includes a diffuser in the form of a plate with a plurality of apertures therethrough. The diffuser is couplable to the tray and positionable a spaced distance above the top side of the tray.

In one embodiment, a tray includes a generally planar top side and an underside opposite the top side. A plurality of recesses are formed in the top side and define corresponding protrusions extending from the underside. Each protrusion includes a bottom wall and a contoured surface. Each recess presents a non-uniform opening in the top side defined by an arcuate lip connecting the top side with the contoured surface. The contoured surface includes a ledge portion adjacent the bottom wall.

In one embodiment, a tray includes a top side having a top surface, an underside opposite the top side, and a plurality of containment regions. Each containment region has an opening at the top surface, a bottom wall, and a contoured surface connecting the top surface to the bottom wall. The contoured surface includes a ledge portion between the bottom wall and the top surface.

Other aspects of the disclosure will become apparent by consideration of the detailed description and accompanying drawings.

BRIEF DESCRIPTION OF THE DRAWINGS

FIG. 5 is a top view of the tray portion of FIG. 4.

FIG. 6 is a cross-sectional view of the tray portion of FIG. 4 taken along line 6-6 of FIG. 5.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
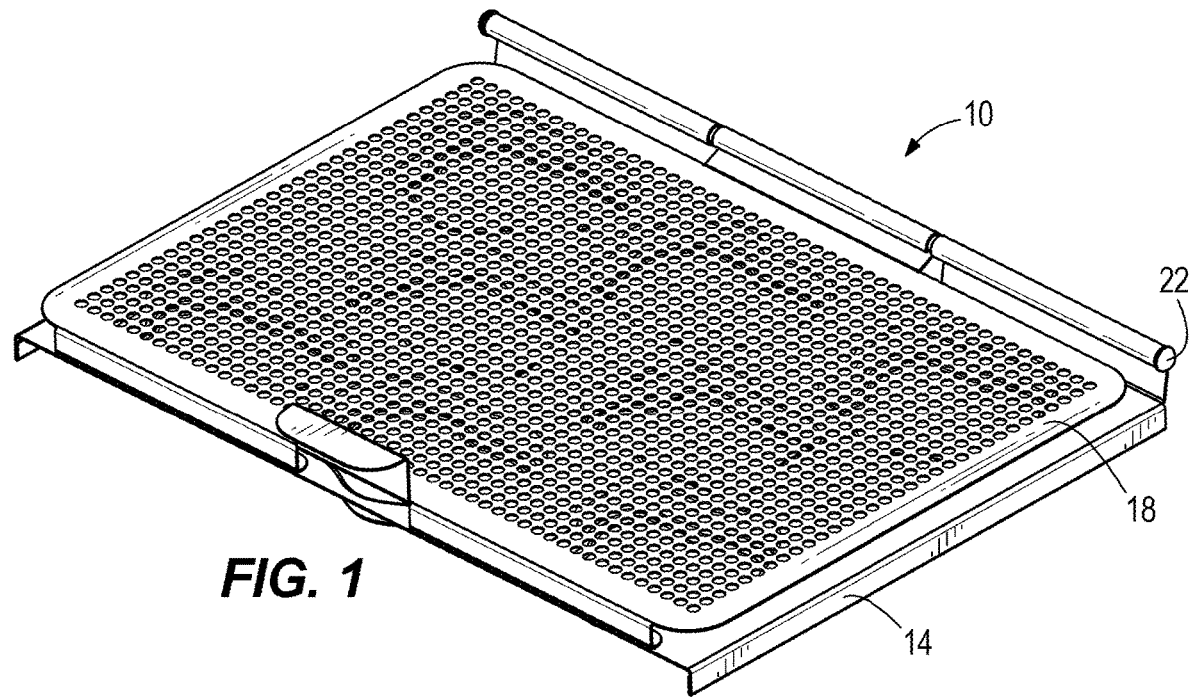
FIG. 1 is a perspective view of a tray assembly in a closed position.
Figure 2:
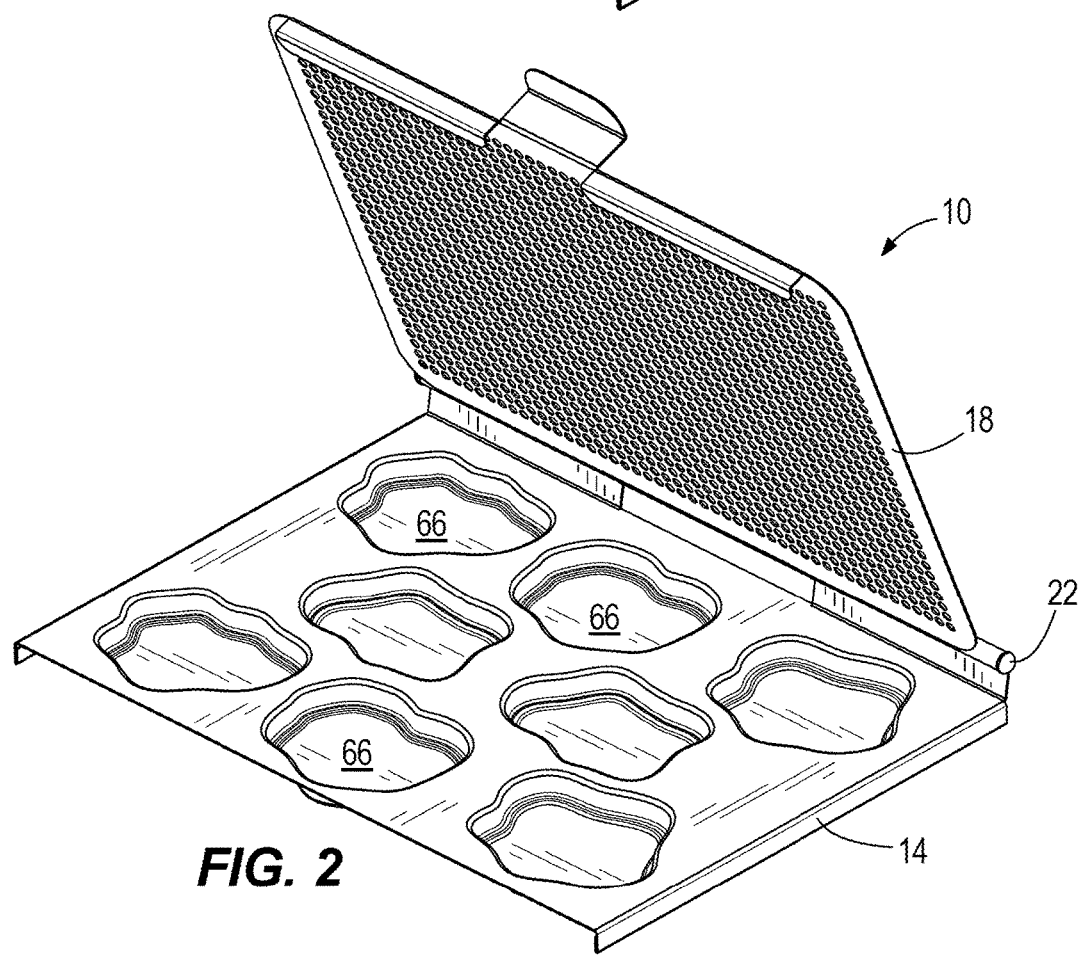
FIG. 2 is a perspective view of the tray assembly of FIG. 1 in an open position.
Figure 3:
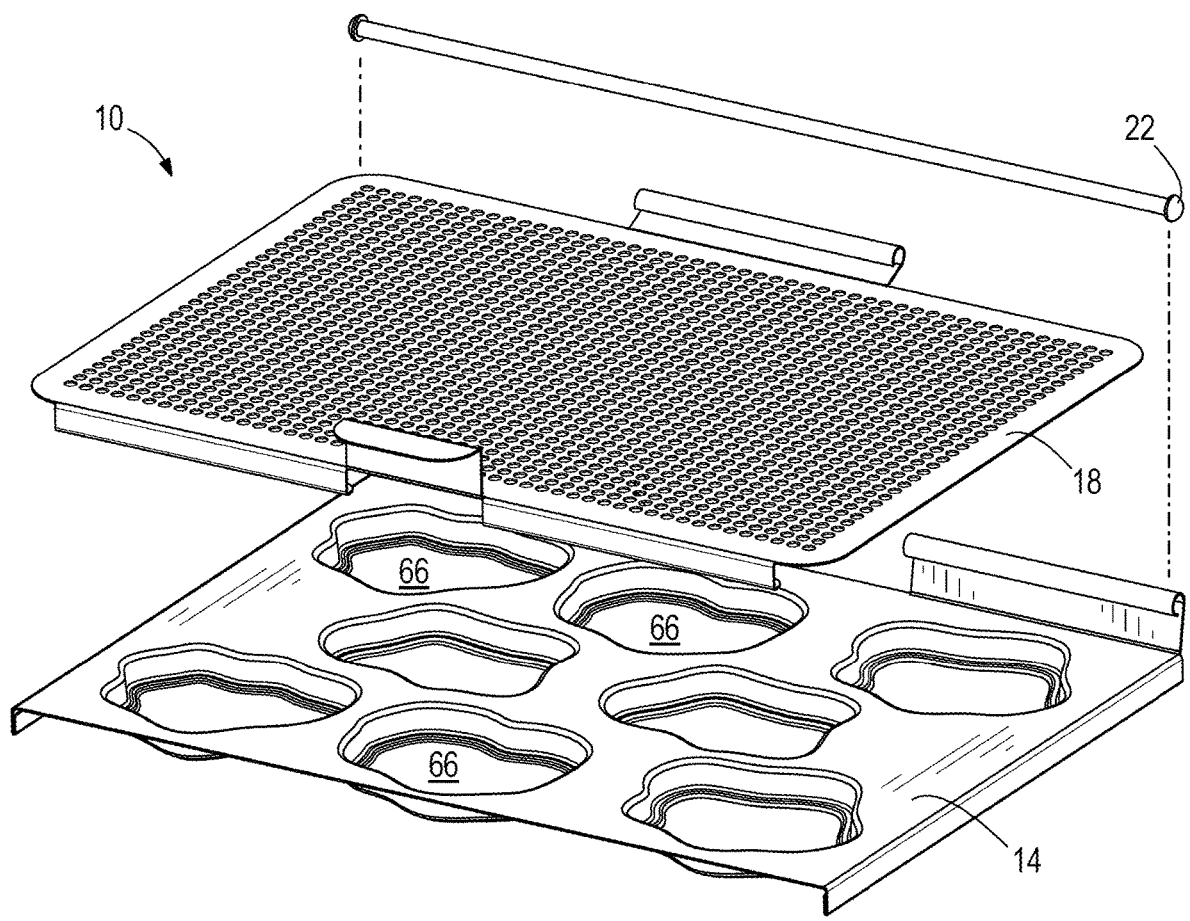
FIG. 3 is an exploded view of the tray assembly of FIG. 1.
Figure 4:
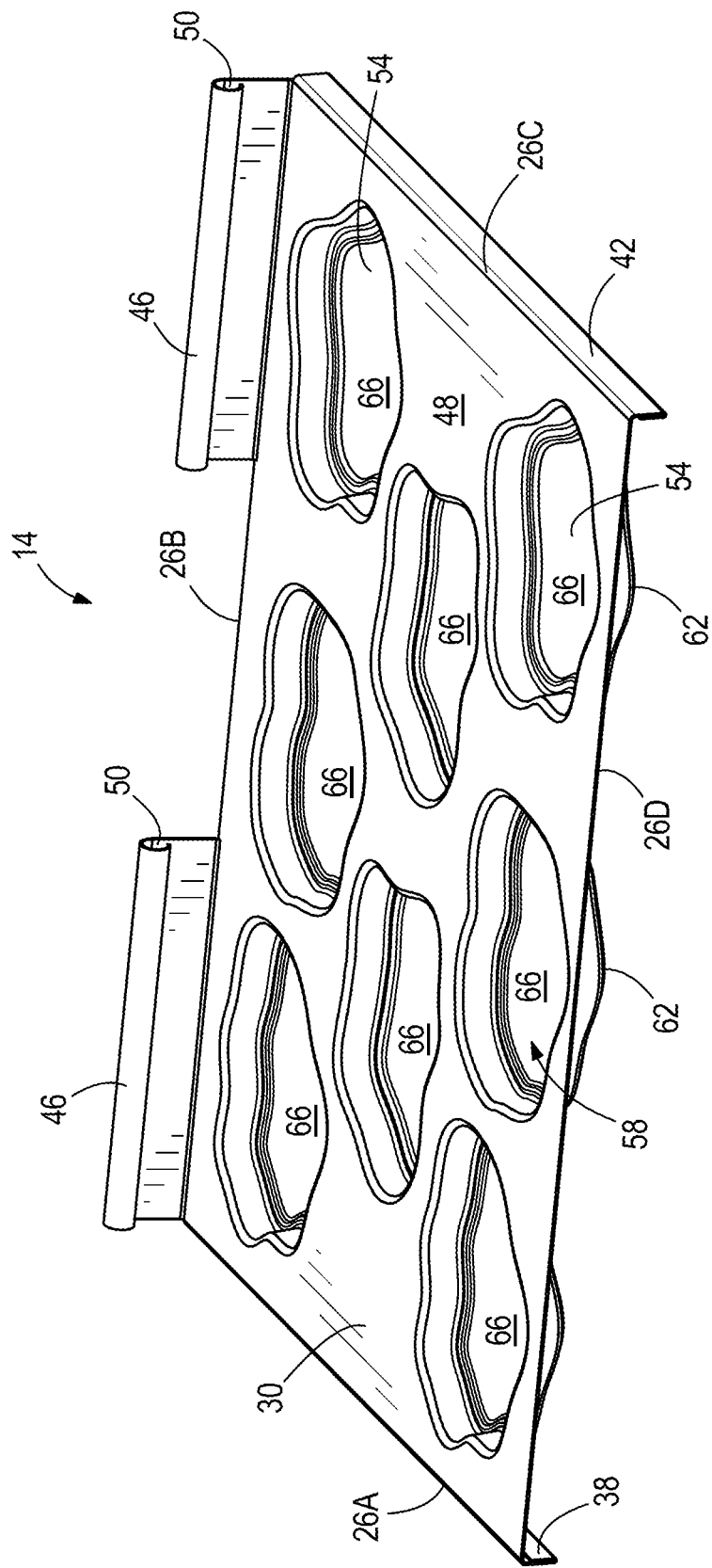
FIG. 4 is a perspective view of a tray portion of the tray assembly of FIG. 1.
Figure 7:
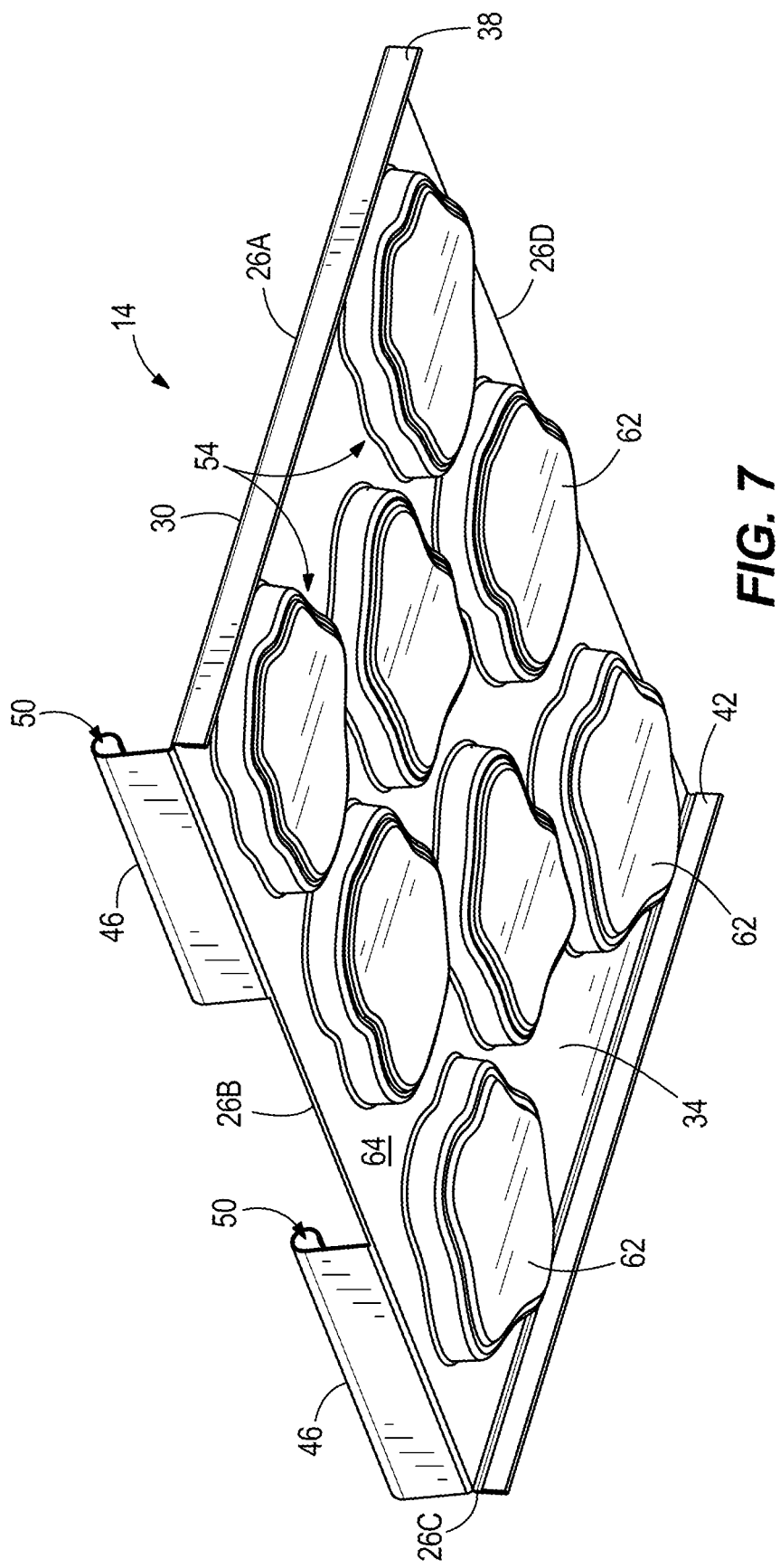
FIG. 7 is a bottom perspective view of the tray portion of FIG. 4.

FIGS. 1-3 illustrate a tray assembly 10 for cooking food in an oven, such as a convection oven, toaster oven, impingement oven, conventional oven, combi oven, or other kind of oven. The tray assembly 10 may cook a variety of foods, although, preferably, the tray assembly 10 is used to cook eggs or egg product derivatives, such as scrambled eggs and/or egg whites and as such, discussion of the tray assembly 10 below will be in reference to cooking eggs. The tray assembly 10 includes a tray portion or tray 14, a diffuser plate 18, and a connecting rod 22.

With additional reference to FIGS. 4-7, the tray 14 is generally in the form of a rectangular plate or sheet defined by four edges 26A-D. As illustrated, the tray 14 includes a top side 30, an underside 34 opposite the top side 30, a first side flange 38 extending from the side edge 26A generally orthogonally to the underside 34, and a second side flange 42 extending from the side edge 26C opposite the side edge 26A. Lateral hinge sleeves or knuckles 46 defining slots 50 extend from the side edge 26B away from the top side 30. A length L1 (FIG. 5) of the tray 14 extends between the side edges 26A, 26C and a width W1 of the tray 14 extends in a direction perpendicular to the length L1 between the side edges 26B, 26D. In the illustrated embodiment, the length L1 can range between four and 30 inches and the width W1 can range between six and 20 inches depending on the number of eggs the tray is designed to cook. The tray 14 may be made from aluminum or other heat conducting metals, with or without a non-stick surface. Alternatively, the tray 14 may be made out of glass, composite, or other food safe material.

The top side 30 of the tray 14 is generally planar and presents a top surface 48. The tray 14 further includes a plurality of depressions or recesses 54, each defining an opening 58 in the top surface 48 and forming a protrusion 62 extending from a bottom surface 64 on the underside 34 and having a bottom or bottom wall 66. This may be described as the top surface 48 following the contour of the depressions 54 on the top side 30 and the bottom surface 64 following the contour of the protrusions 62 on the underside 34. Alternatively, the tray 14 can be described as including a plurality of bowls, cups, containers, or containment regions 62 with openings 58 in the top surface 48. In the illustrated embodiment, the overall depth of the protrusion (s) 62 measured between the top surface 48 and a protrusion bottom 68 in a direction perpendicular to the top surface 48 is identified as D1. In the illustrated embodiment, the distance D1 ranges between zero inches and one inch. Referring to FIG. 6, flanges 38, 42 have a height less than D1.

In the illustrated embodiment, there are eight such recesses 54. In other embodiments, there may be fewer or more than eight recesses 54. In some embodiments, the recesses 54 may be circular in shape or may have a conventional or other standard shape at the top surface 48. In a preferred embodiment, the recesses are irregularly shaped, i.e., non-circular, with a non-standardized contour at the top surface 48.

Figure 8:
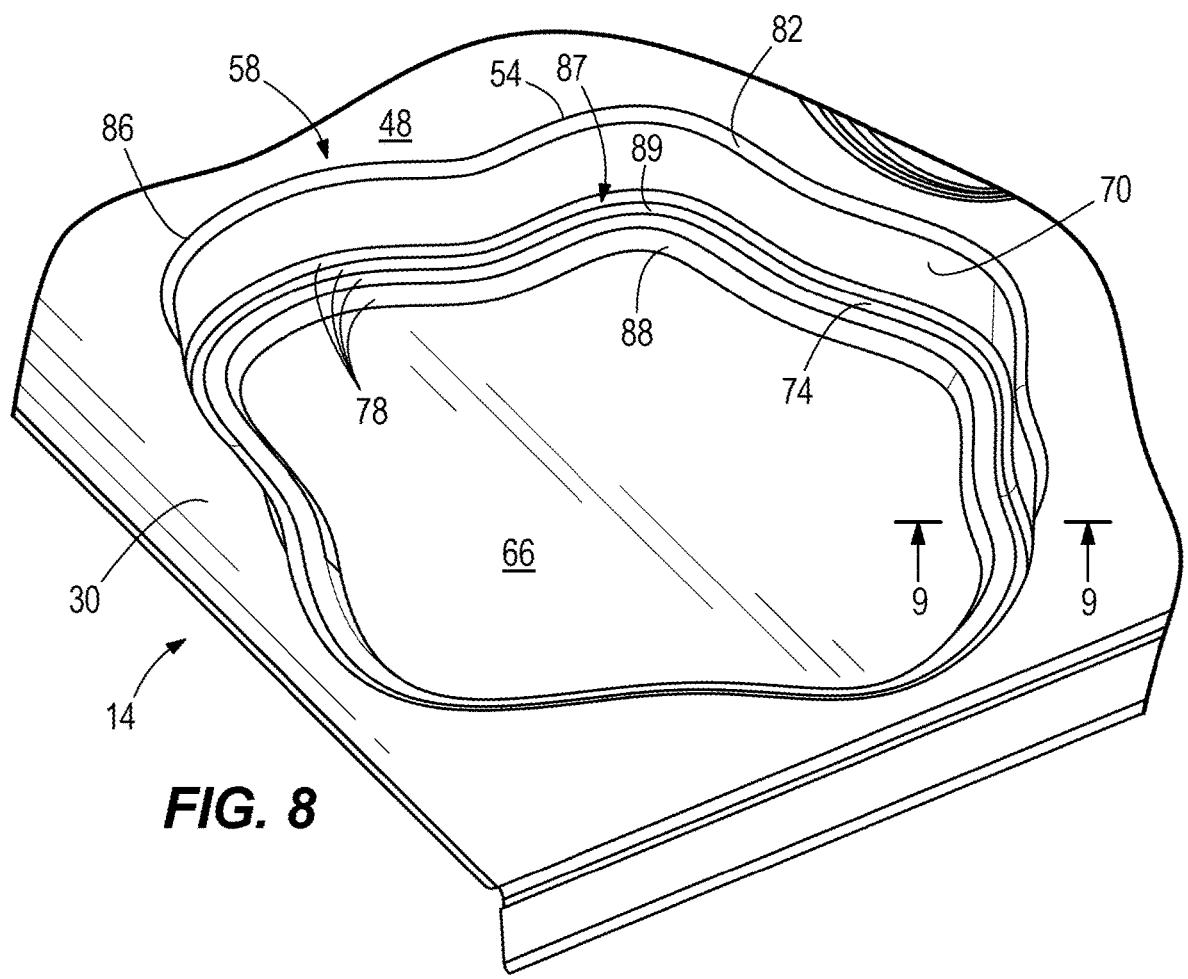
FIG. 8 is a close up perspective view of a recess of the tray portion of FIG. 4.
Figure 9:
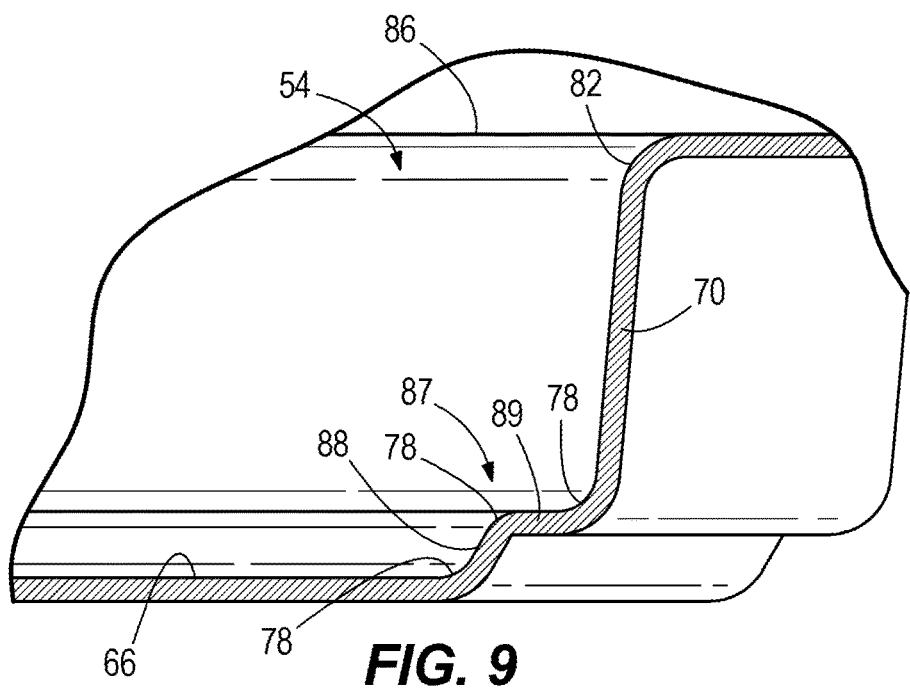
FIG. 9 is a cross-sectional view of the recess of FIG. 8 taken along line 9-9 of FIG. 8.

Referring to FIGS. 8 and 9, each protrusion or depression 62 includes the bottom wall 66, a side wall 70, and a contoured surface 74 that extends between the bottom wall 66 and the side wall 70. The contoured surface 74 comprises a plurality of surfaces 78 angled relative to each other. The surfaces 78 may be planar or may be curved. The surfaces 78 may alternatively be described as a plurality of steps or ledges joined at beveled or filleted edges relative to one other. With additional reference to FIG. 9, for example, a step 87 between the bottom wall 66 and the side wall 70 is defined by an angled or curved surface 88 and a horizontal surface 89. The horizontal surface 89 is generally planar and positioned above the bottom wall 66 so that the bottom wall 66 and the horizontal surface 89 lie in planes that are parallel to each other, i.e., the surface 89 forms a crisping edge or ledge. The step 87 is adjacent the bottom wall 66. In the illustrated embodiment, the surface 89 is positioned on the side wall 70 at a location that ranges between 0.075 inches to 0.15 inches from the bottom wall 66 (in a direction perpendicular to the bottom wall 66). In some embodiments, the surface 89 is positioned on the side wall 70 at a location ranging between 10% and 30% of the depth of the recess 54 (defined between the bottom wall 66 and the top surface 48) from the bottom wall 66. In other embodiments, the surface 89 may be positioned on the side wall 70 at other locations.

At the top of the side wall 70 is a smoothly rounded, arcuate, or filleted edge or lip 82 that defines an outer perimeter 86 of the recess 54 with the front side 30 and thus the irregular shape of the recess 54.

Figure 10:
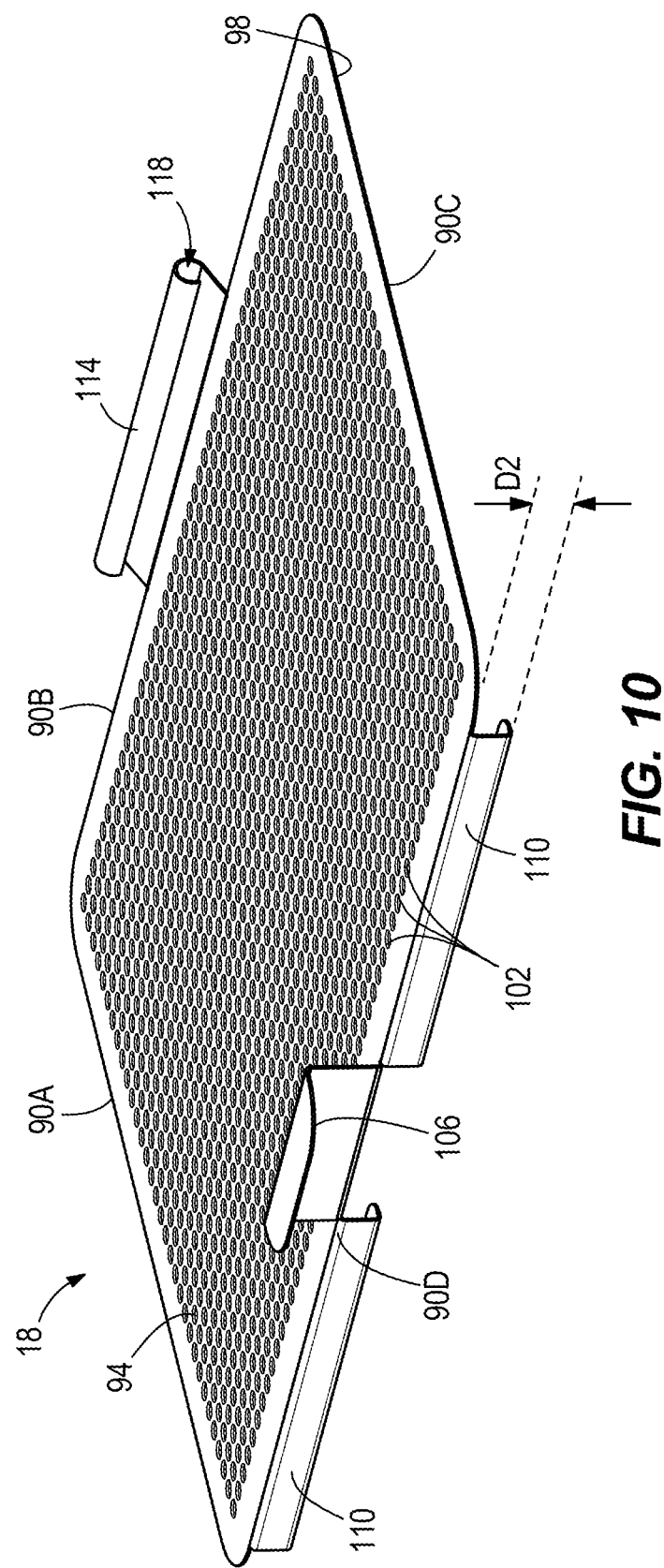
FIG. 10 is a perspective view of a diffuser for the tray assembly of FIG. 1.
Figure 11:
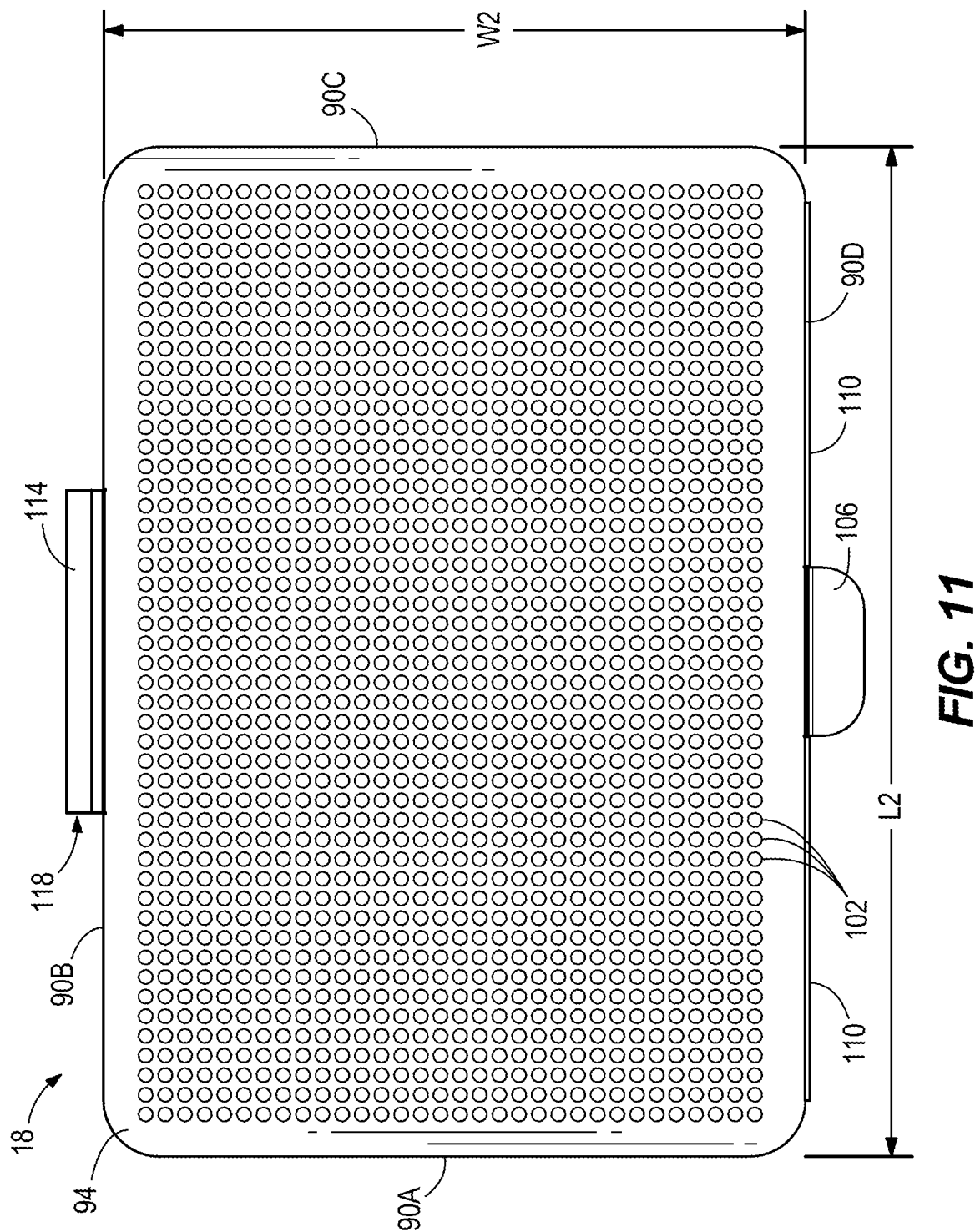
FIG. 11 is a top view of the diffuser of FIG. 10.

With reference to FIGS. 10 and 11, the diffuser plate 18 is generally defined by four side edges 90A-D. As illustrated, the diffuser plate 18 includes a top side 94 and an underside 98 opposite the top side 94. A length L2 (FIG. 11) of the plate 18 extends between the side edges 90A, 90C and a width W2 of the plate 18 extends in a direction perpendicular to the length L2 between the side edges 90B, 90D. In the illustrated embodiment, the length L2 can range between four and 30 inches and the width W2 can range between six and 20 inches. Similar to the tray 14, the diffuser plate 18 may be made from aluminum or other heat conducting metals. Alternatively, the diffuser plate 18 may be made out of glass, composite, or other food safe material.

A plurality of apertures 102 extend from the top side 94 to the underside 98 through the plate 18. In the illustrated embodiment, the apertures 102 are aligned in rows and columns. In other embodiments, the apertures 102 may have rows and columns that are offset from each other. In further embodiments, the apertures 102 may be arranged in different patterns, such as circular patterns or eccentric patterns, or may be random. In the illustrated embodiment, the apertures 102 have a diameter between $\frac{1}{16}$ inch and $\frac{3}{8}$ inch. Preferably, the diameter of the apertures 102 is $\frac{1}{8}$ inch. In some embodiments, the apertures 102 need not be circular, but may be shaped otherwise with a maximum distance across of between $\frac{1}{8}$ inch and $\frac{3}{8}$ inch.

The diffuser plate 18 further includes an L-shaped lift surface or handle 106 centrally positioned between two flanges 110 extending from the underside 98 adjacent the side edge 90D, as shown. A central hinge sleeve or knuckle 114 extends from the edge 90B away from the top side 94 and defines a slot 118. In some embodiments, the diffuser plate 18 may not include the handle 106 or the knuckle 114.

To assemble the tray assembly 10, the diffuser plate 18 is positioned above the tray 14. The knuckle 114 on the diffuser plate 18 is positioned between the pair of knuckles 46 on the tray 14 and the slots 50, 118 are aligned. The connecting rod 22 is then inserted axially through the slots 50, 118 to rotatably couple the tray 14 to the diffuser plate 18. The tray assembly 10 can now be moved or pivoted from an open position (FIG. 2) to a closed position (FIG. 1). In other embodiments, the tray 14 may be coupled to the diffuser plate 18 in other ways. For example, one of the tray 14 or the diffuser plate 18 may include a latch that couples to a catch on the other of the tray 14 or diffuser plate 18. The diffuser plate 18 may alternatively be coupled to the tray 14 using a bracket pair, a supporting flange, or other interfacing rotatable coupling elements. In other embodiments, the diffuser plate 18 may rest over the tray 14 in a spaced-apart fashion, i.e., with flanges 110, with or without an interlocking or engaging feature therebetween.

When assembled as illustrated, the flanges 110 position the diffuser plate 18 a distance D2 (FIG. 10) above the tray 14. The distance D2 ranges between zero inch and one inch.

When using the tray assembly 10, a user pivots the diffuser plate 18 away from the tray 14 to expose the tray 14 and the recesses 54 for easier insertion of food product. Alternatively, a user may simply lift the diffuser plate 18 off of the tray 14. In a particular application, one or more raw eggs or egg products are put into each recess 54. In the illustrated embodiment, each containment region 62 has a volume configured such that the volume of egg or egg product fills up each recess 54 to a level no more than 0.10 inches below the top surface 48. Once the eggs have been so placed, the user pivots the diffuser plate 18 back over the top side 30 to put the tray assembly 10 into the closed position. The tray assembly 10 can now be put in an oven (e.g., an impingement oven), and when inserted the protrusions 62 contact a cooking rack or sheet of the oven. When placed on the rack or sheet, therefore, the top surface 48 of the tray 14 is located the distance D1 (FIG. 6) above the cooking rack or sheet of the oven. In other embodiments, the side flanges 38, 42 may have a height equal to or greater than D1 and contact the cooking rack or sheet such that the protrusion bottom 68 is elevated relative to the rack or sheet. After the eggs are cooked for a pre-defined time (e.g., two minutes), a user can remove the tray assembly 10 from the oven and rotate the plate 18 from the tray 14 to remove the eggs.

In other embodiments, the tray 14 and diffuser 18 may be differently shaped (circular or otherwise curvilinear, polygonal, etc.) as long as the relationship between the tray 14 and diffuser plate 18 is such that the diffuser is configured to overlie a portion or the entirety of the tray 14, and in particular the recesses 54, during cooking.

The irregular shape of the recesses 54 allows for the eggs to be baked in a natural shape as if, for example, the egg was fried in a pan. The step 87 including the horizontal surface 89 increases overall egg/tray contact surface area and raises portions of the egg whites above the bottom wall 66 to form and crisp more of the egg outer perimeter. Additionally, the shape of the lip 82 provides for a very thin outer layer of egg white such that the top periphery of the finished egg is uniformly crispy. The diffuser plate 18, via the plurality of apertures 102, diffuses air from the oven more evenly over the top surface 48 and therefore more evenly over all of the recesses 54 for consistent cooking throughout the tray 14. Additionally, the diffusion of air over the top surface 48 reduces the instance of overcooking the top visual surface of the egg during a pre-defined cooking period, resulting in a more pleasing presentation of the cooked product. Such diffusion has been found to be especially beneficial in cooking egg yolks to a desired color, texture, and appearance.

Figure 12:
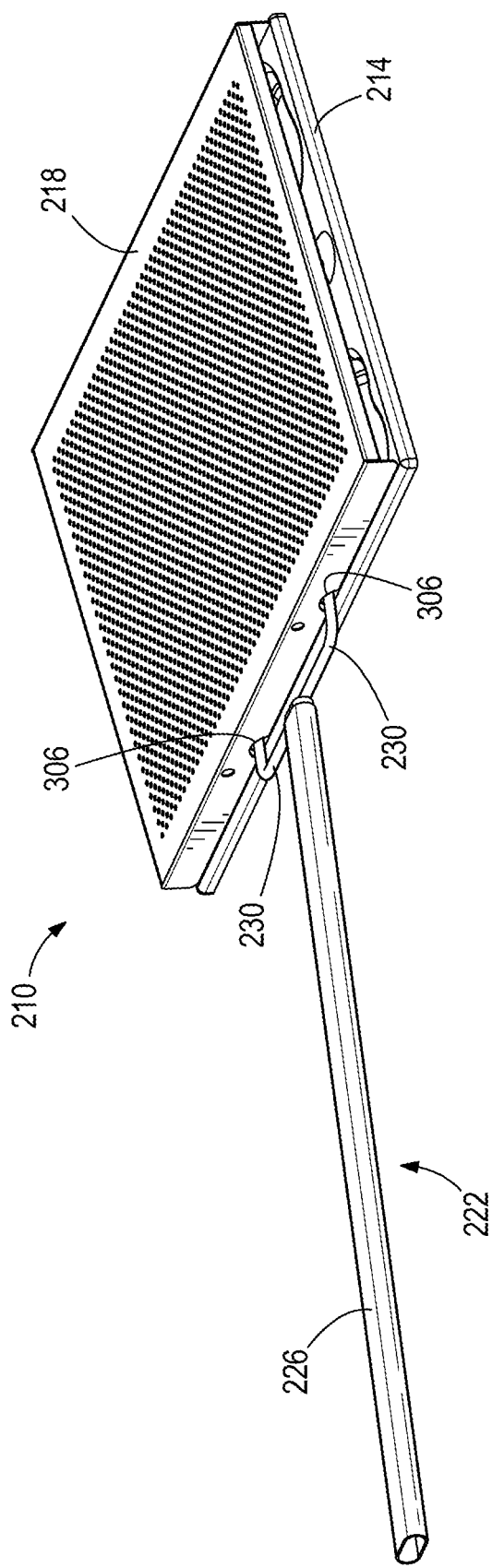
FIG. 12 is a perspective view of a tray assembly according to another embodiment in a closed position.
Figure 13:
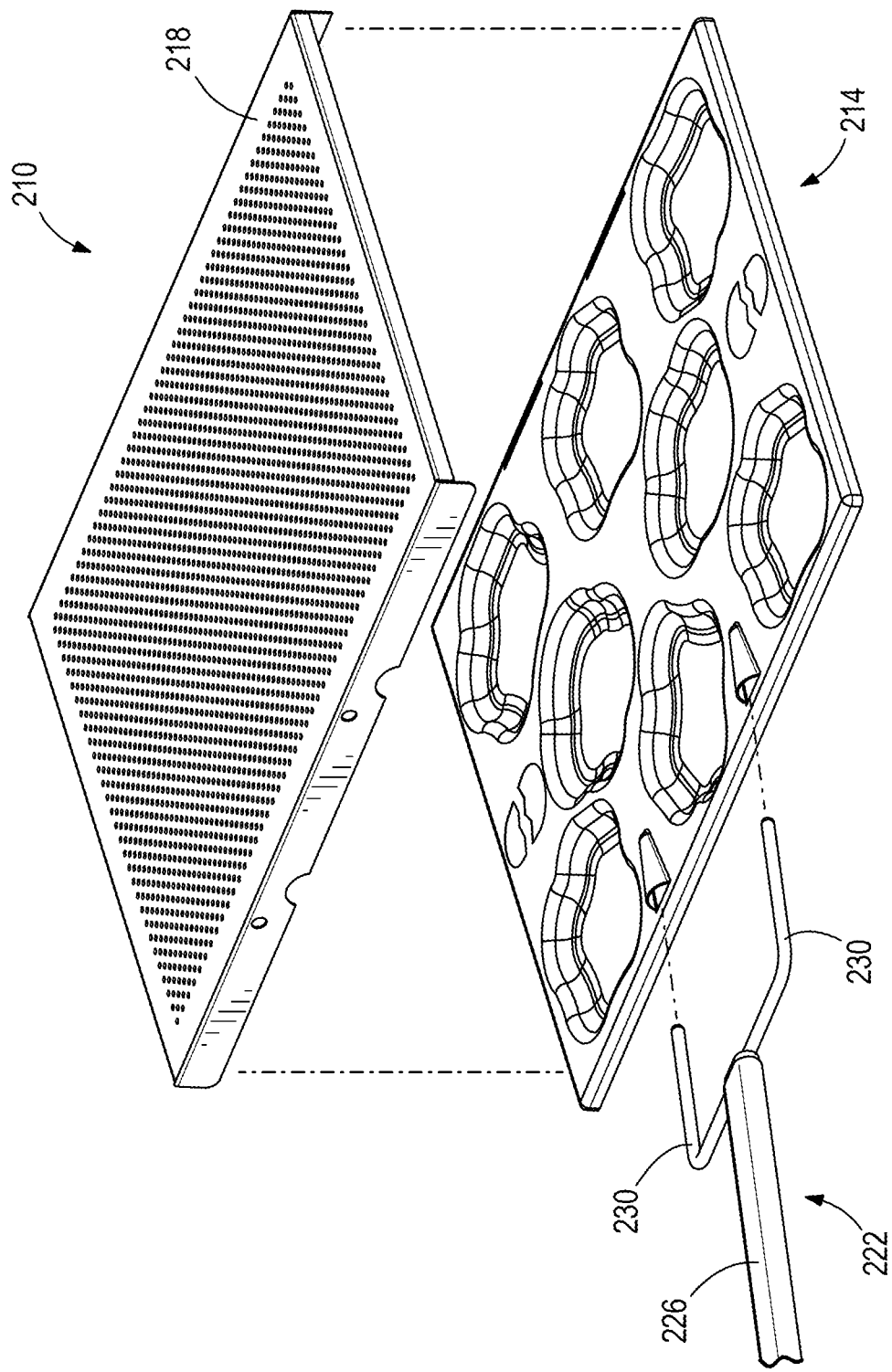
FIG. 13 is an exploded view of the tray assembly of FIG. 12.
Figure 14:
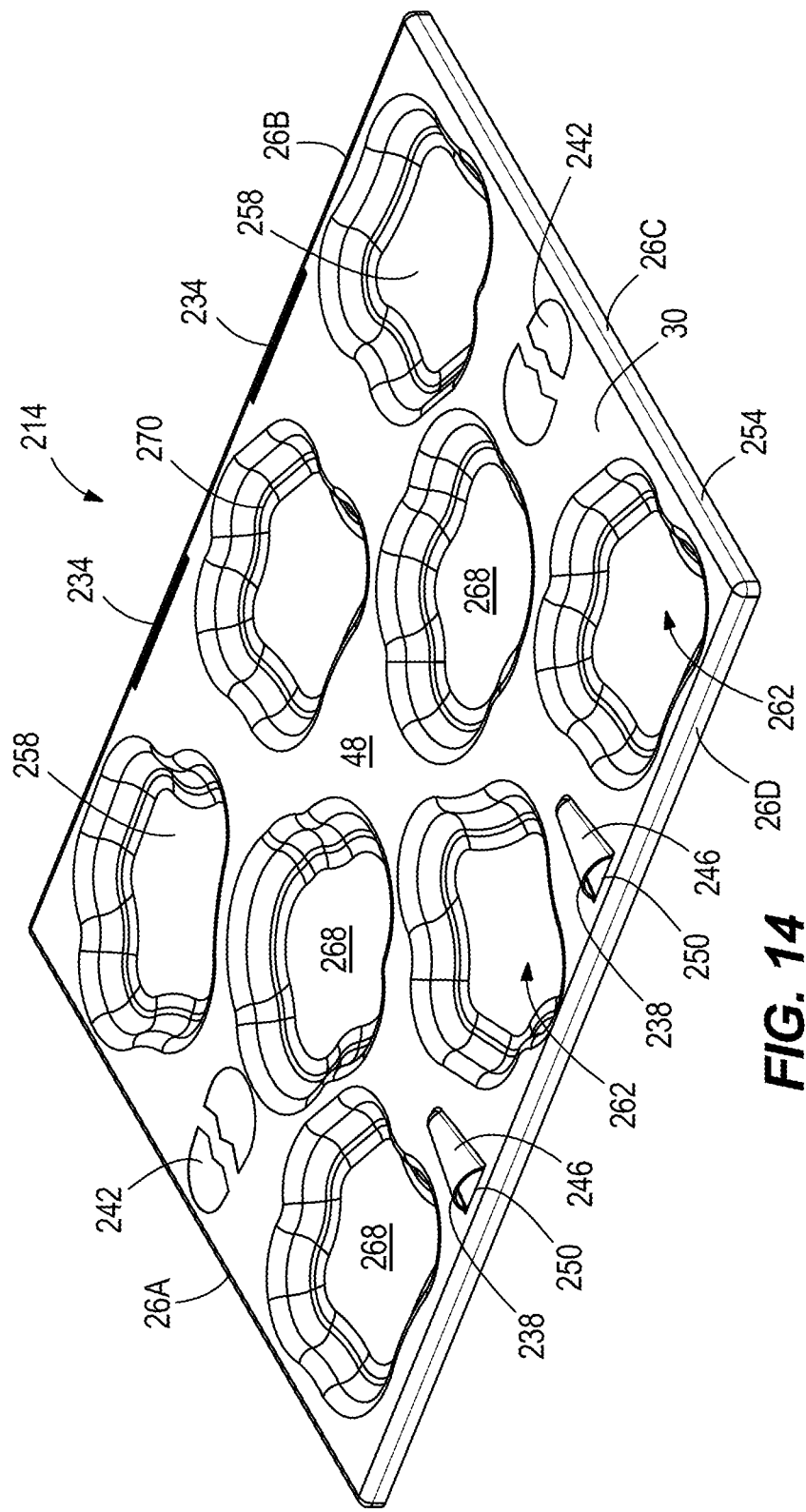
FIG. 14 is a perspective view of a tray portion of the tray assembly of FIG. 12.
Figure 15:
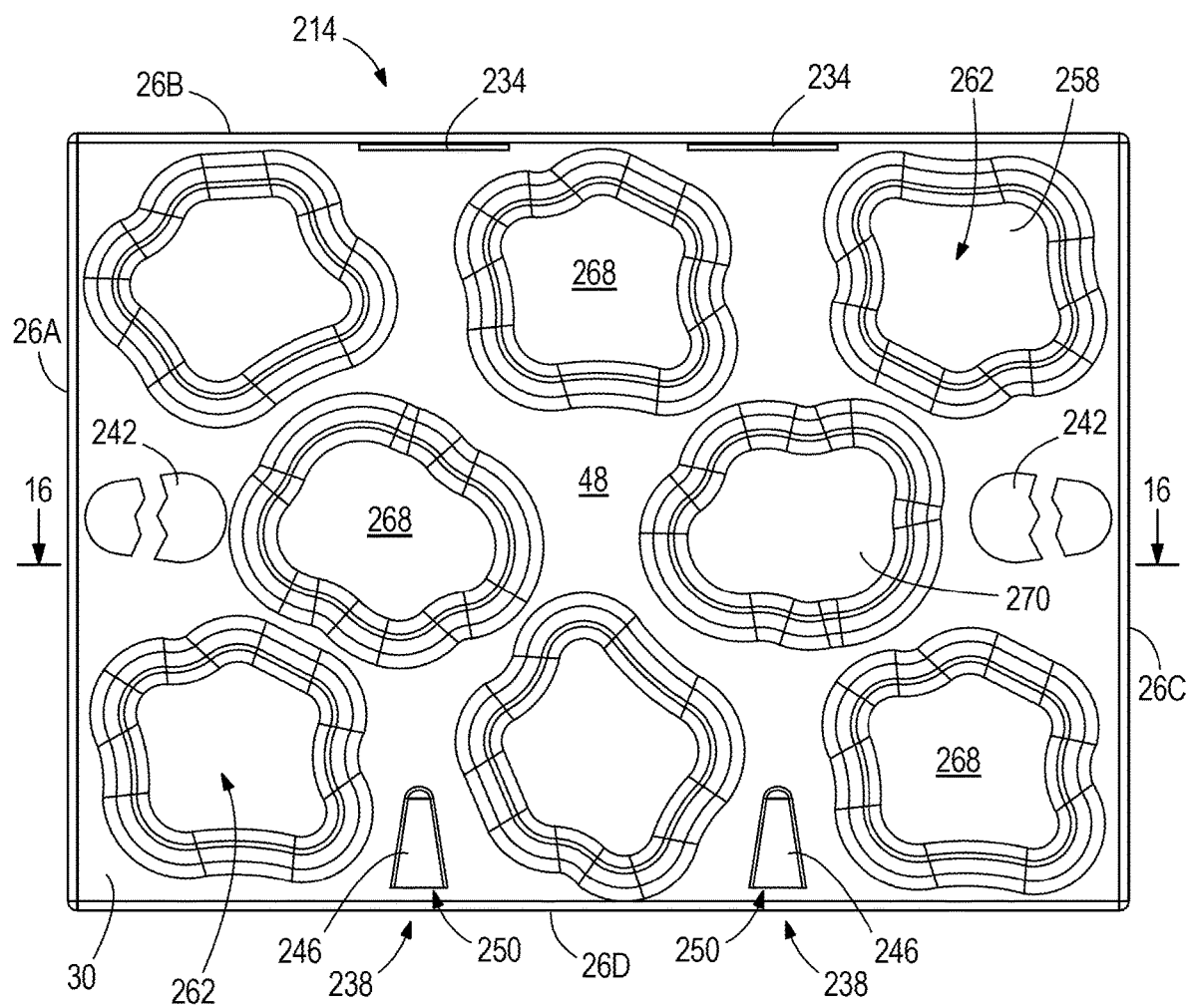
FIG. 15 is a top view of the tray of FIG. 14.

FIGS. 12 and 13 illustrate a tray assembly 210 according to another embodiment. The tray assembly 210 is similar to the tray assembly 10 with like features being represented by like reference numerals. The tray assembly 210 includes a tray 214, a diffuser plate 218, and a handle 222 with an elongated shaft 226 and prongs 230.

With reference to FIGS. 14-17, the tray 214 is similar to the tray 14 but further includes slots 234 adjacent the back side edge 26B, eyelets 238 (e.g., half shears, frog eyes, etc.) adjacent the front side edge 26D, and indicia 242 adjacent the side edges 26A, 26C. The eyelets 238 each include a raised portion 246 that extends from the top side 30 and an opening 250 extending through the raised portion 246.

The indicia 242 may identify the targeted use of the tray 214. For example, in the illustrated embodiment, the indicia 242 represent a cracked egg indicating to a user that the tray 214 is used to cook eggs. In other embodiments, the tray 214 may include indicia that indicate other food product uses. In addition, the tray 214 includes a single uniform flange 254 that extends around all of the side edges 26A-26D.

Figure 16:
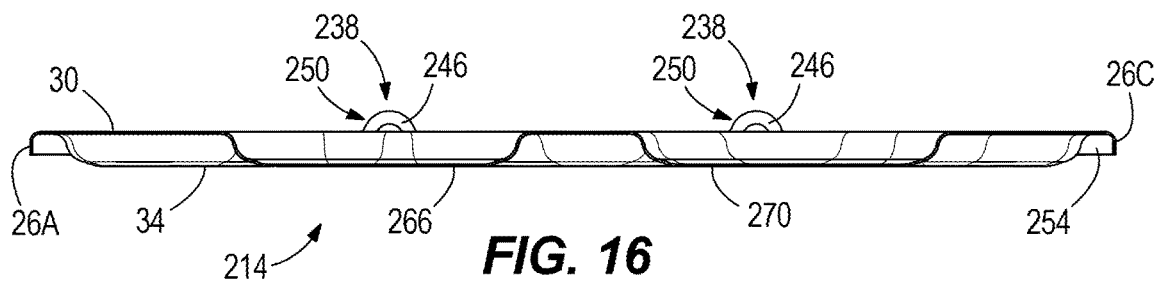
FIG. 16 is a cross-sectional view of the tray portion of FIG. 14 taken along line 16-16 of FIG. 15.
Figure 17:
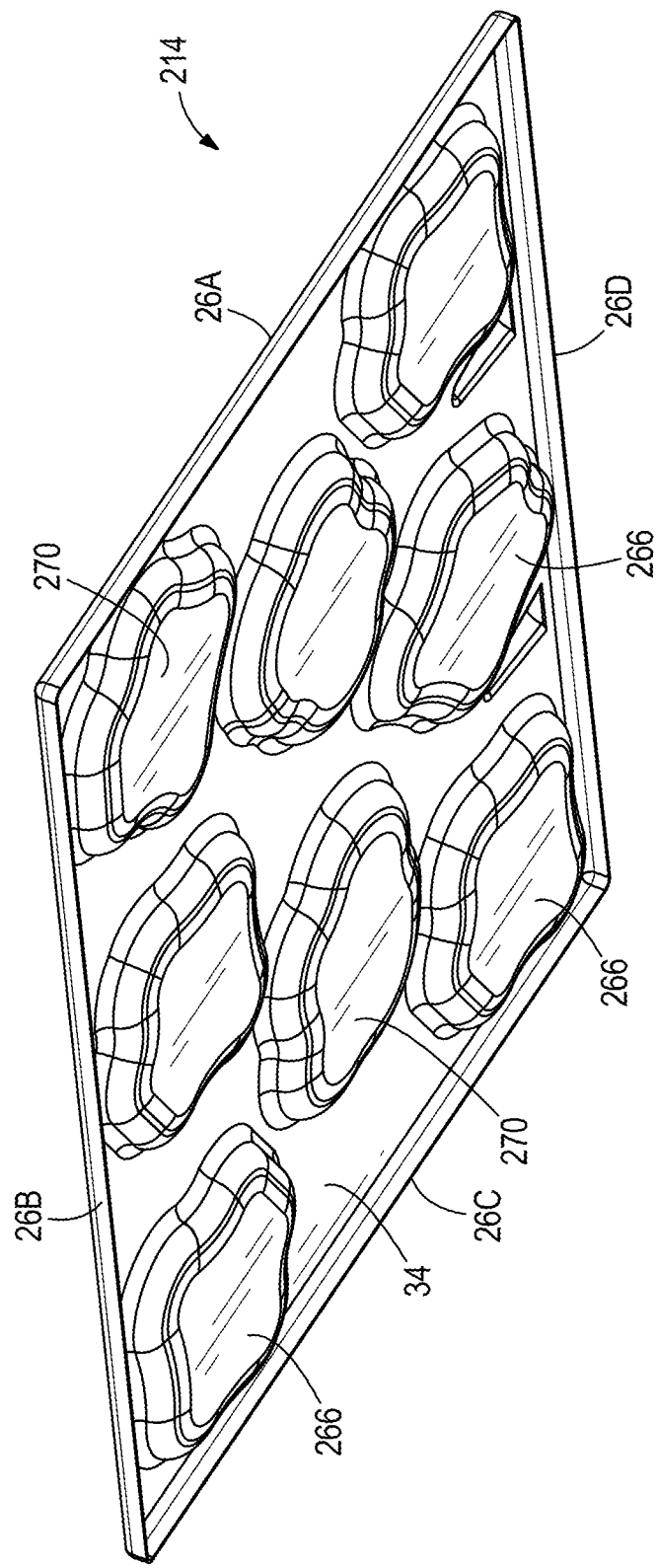
FIG. 17 is a bottom perspective view of the tray portion of FIG. 14.

Similar to the tray 14, the tray 214 includes a plurality of depressions or recesses 258, each defining an opening 262 in the top surface 48 and forming a protrusion 266 extending from the bottom surface 64 (FIG. 17) on the underside 34 and having a bottom or bottom wall 268, in a manner as previously described. Alternatively, the tray 214 can be described as including a plurality of bowls, cups, containers, or containment regions 266 with openings 262 in the top surface 48. In the illustrated embodiment, the overall depth of the protrusion(s) 266 measured between the top surface 48 and a protrusion bottom 270 in a directional perpendicular to the top surface 48 is identified as D3. In the illustrated embodiment, the distance D3 ranges between zero inches and one inch. Referring to FIG. 16, flange 254 has a height less than D3.

In the illustrated embodiment, there are eight such recesses 258. In other embodiments, there may be fewer or more than eight recesses 258. In some embodiments, the recesses 258 may be circular in shape or may have a conventional or other standard shape at the top surface 48. In a preferred embodiment, the recesses 258 are irregularly shaped with a non-standardized contour at the top surface 48.

Figure 18:
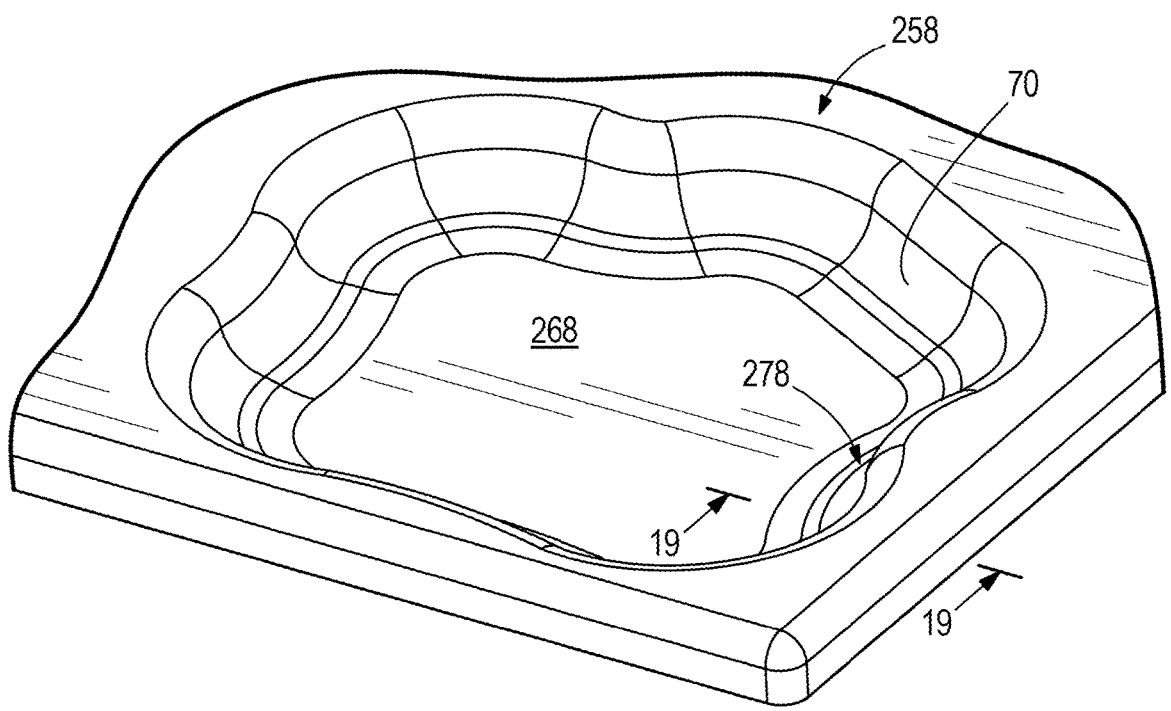
FIG. 18 is a close up perspective view of a recess of the tray portion of FIG. 14.
Figure 19:
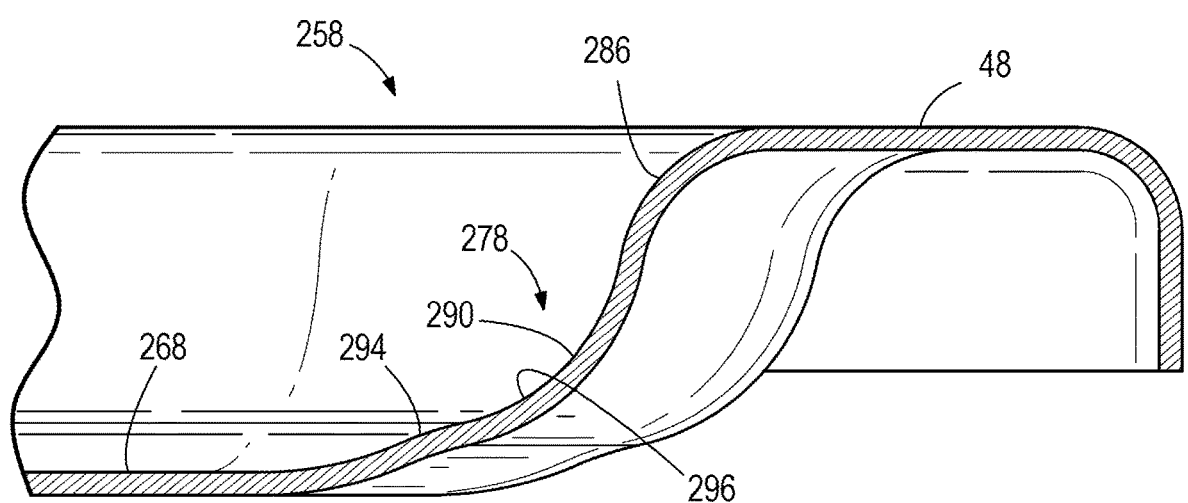
FIG. 19 is a cross-sectional view of the recess of FIG. 18 taken along line 19-19.

Referring to FIGS. 18 and 19, each recess 258 includes a contoured surface 278. The contoured surface 278 comprises a first convex portion 286 extending from the top side 30, a second concave surface 290 adjacent the first surface 286, and a third surface 294 extending from the second surface 290 to the bottom wall 268. In other embodiments, the contoured surface 278 may be segmented or formed as the contoured surface 74. A transition 296 is defined between the concave surface 290 and the surface 294. The transition 296 may also form a ledge or a step (i.e., a crisping edge or ledge). In the illustrated embodiment, the transition 296 is positioned on the contoured surface 278 at a location that ranges between 0.075 inches to 0.15 inches from the bottom wall 268 (in a direction perpendicular to the bottom wall 268). In some embodiments, the transition 296 is positioned on the contoured surface 278 at a location ranging between 10% and 30% of the depth of the recess 258 (defined between the bottom wall 268 and the top surface 48) from the bottom wall 268. In other embodiments, the transition 296 may be positioned on the contoured surface 278 at other locations.

Figure 20:
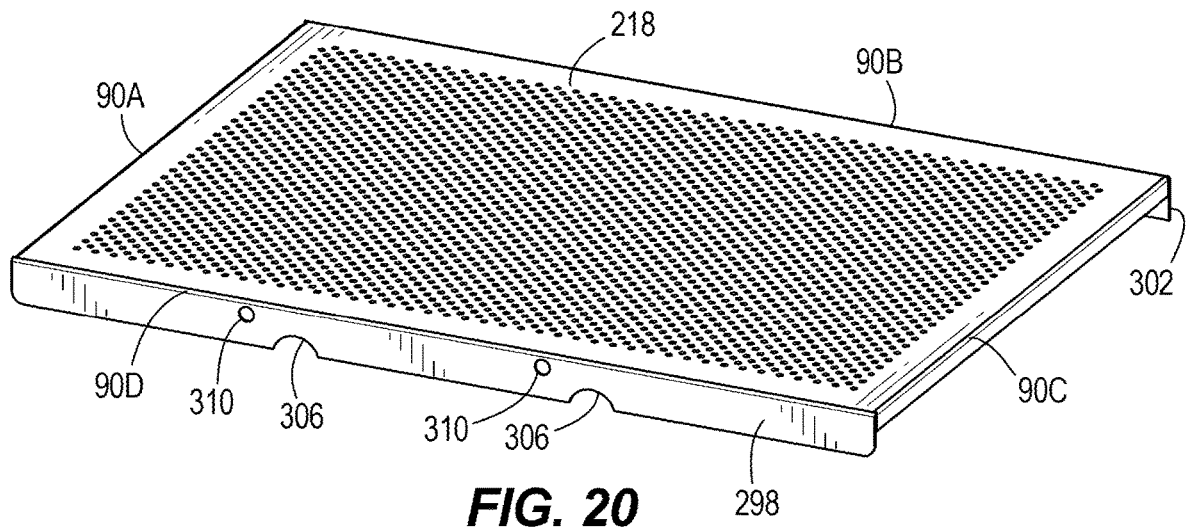
FIG. 20 is a front perspective view of a diffuser for the tray assembly of FIG. 12.
Figure 21:
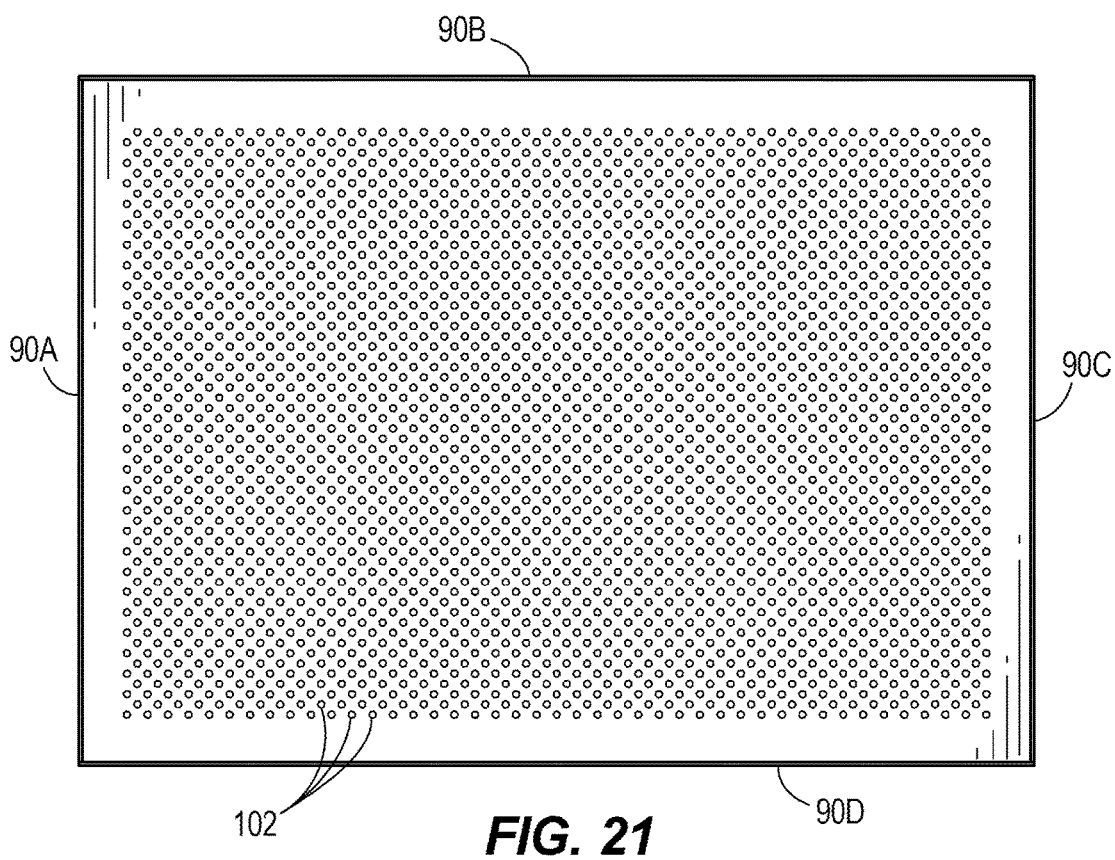
FIG. 21 is a top view of the diffuser of FIG. 20.
Figure 22:
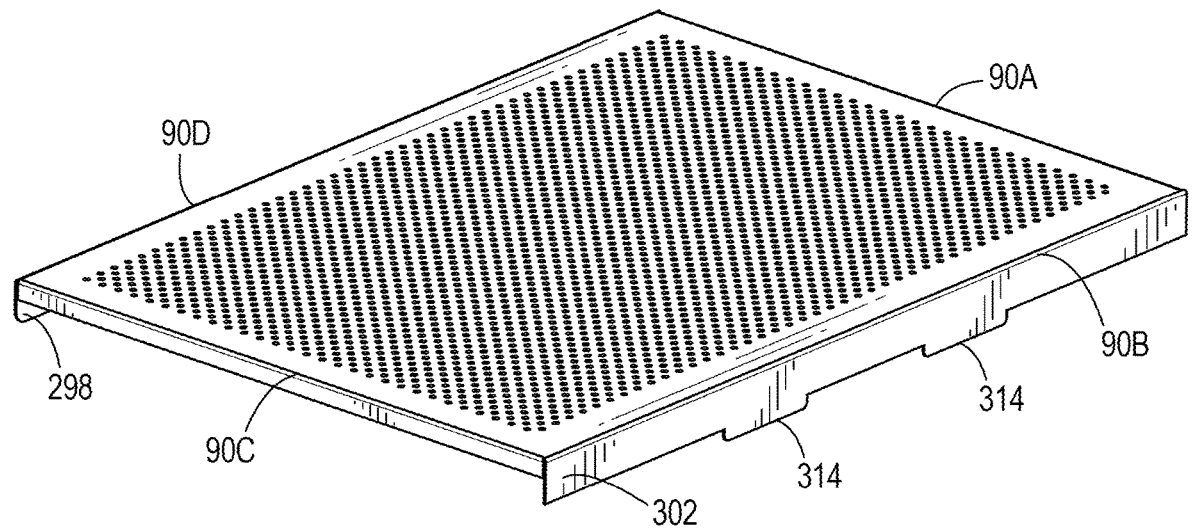
FIG. 22 is a rear perspective view of the diffuser of FIG. 20.

With reference to FIGS. 20-22, the diffuser plate 218 is similar to the diffuser plate 18 but does not include the knuckle 114 or the handle 106. In addition, the diffuser plate 218 includes a front flange 298 adjacent the side edge 90D and a rear flange 302 adjacent the side edge 90B. Referring to FIG. 20, the front flange 298 includes a pair of arcuate slots 306 and a pair of apertures 310. The distance between the pair of slots 306 is equal to the distance between the pair of apertures 310, though this need not be the case in all embodiments. Both the pair of slots 306 and the pair of apertures 310 are configured to receive the handle 222. With reference to FIG. 22, the back flange includes a pair of tabs 314 that correspond to the slots 234 on the tray 214. As shown in FIG. 21, the apertures 102 of the diffuser plate 218 are aligned in offset rows and columns, though the apertures could be in any previously described arrangement.

Figure 23:
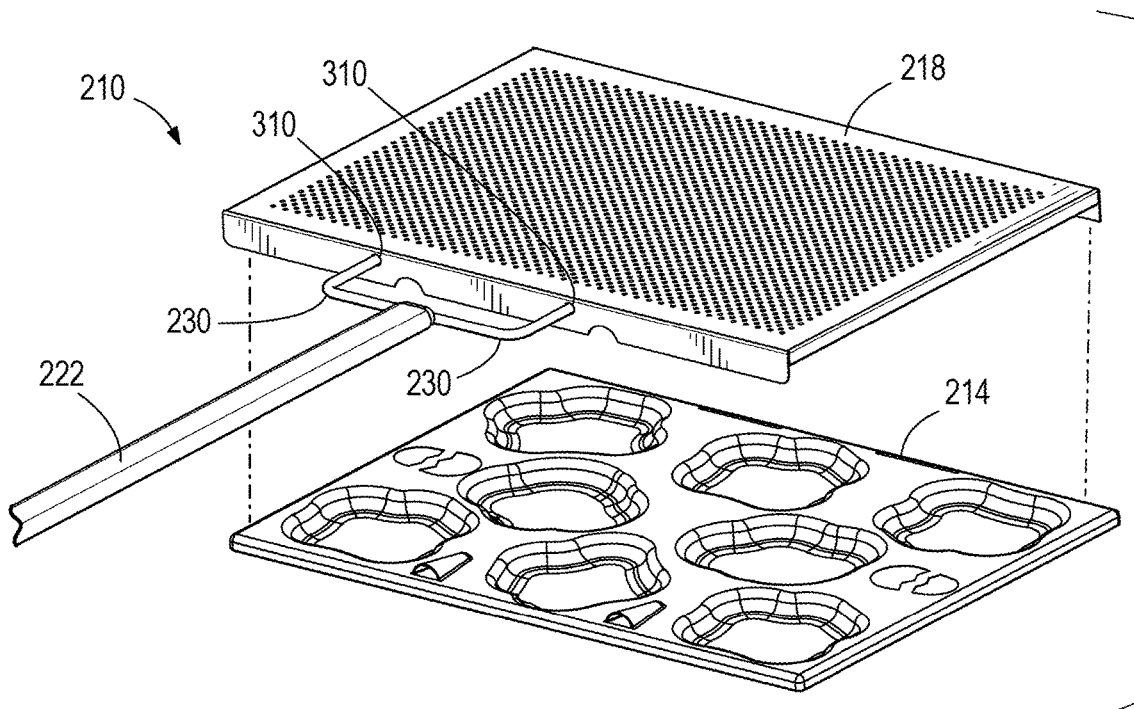
FIG. 23 is a partially exploded view of the tray assembly of FIG. 12.

When using the tray assembly 210, a user places one or more eggs or egg products into each of the uncovered recesses 258 of the tray 214. In the illustrated embodiment, each containment region 266 has a volume configured such that the volume of egg or egg product fills up each recess 258 to a level no more than 0.10 inches below the top surface 48. Once the eggs have been placed, the user positions the diffuser plate 218 on the tray 214 by aligning the tabs 314 with the slots 234. This can be done by inserting the prongs 230 of the handle 222 into the apertures 310 to leverage the diffuser 218 in position, or it can be done manually. Once the tray 14 is so positioned, as shown in FIG. 12, the user may now insert the prongs 230 of the handle 222 into the slots 306 of the diffuser plate 218 and consequently into the eyelets 238 of the tray 214 to facilitate lifting of the entire tray assembly 210. The tray assembly 210 is then placed in an oven (e.g., impingement oven) to cook the eggs or food. After the food has been cooked, the user may use the handle 222 to remove the tray assembly 210 from the oven in the same manner previously described, as due to the heat of the oven, the diffuser plate 218 and the tray 214 after cooking are at a high temperature. As shown in FIG. 23, to avoid direct contact with the diffuser plate 218, the user may place the prongs 230 into the apertures 310 of the diffuser plate 218 to lift the plate 218 from the tray 214 to allow the food or eggs to more quickly cool and/or readily access the cooked product.

Figure 24:
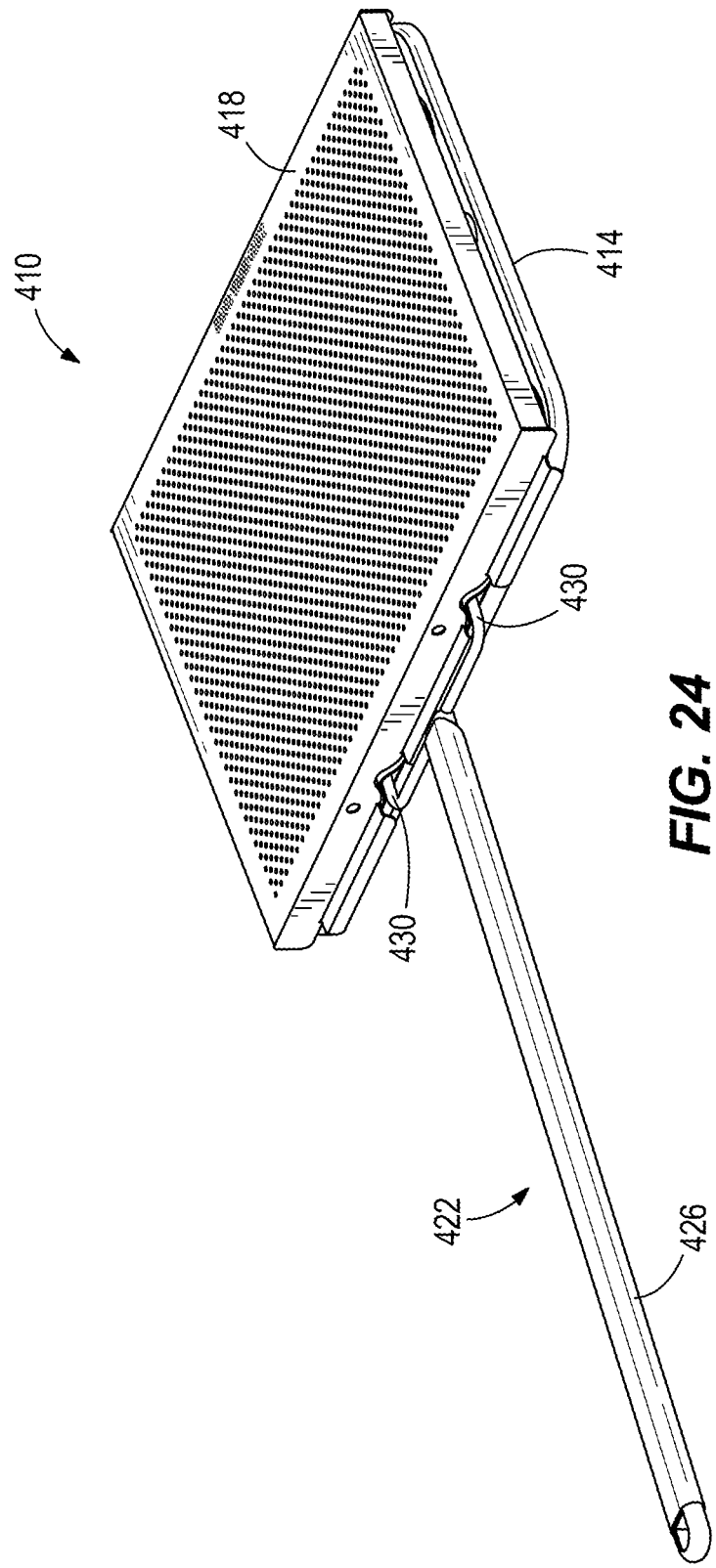
FIG. 24 is a perspective view of a tray assembly according to another embodiment in a closed position
Figure 25:
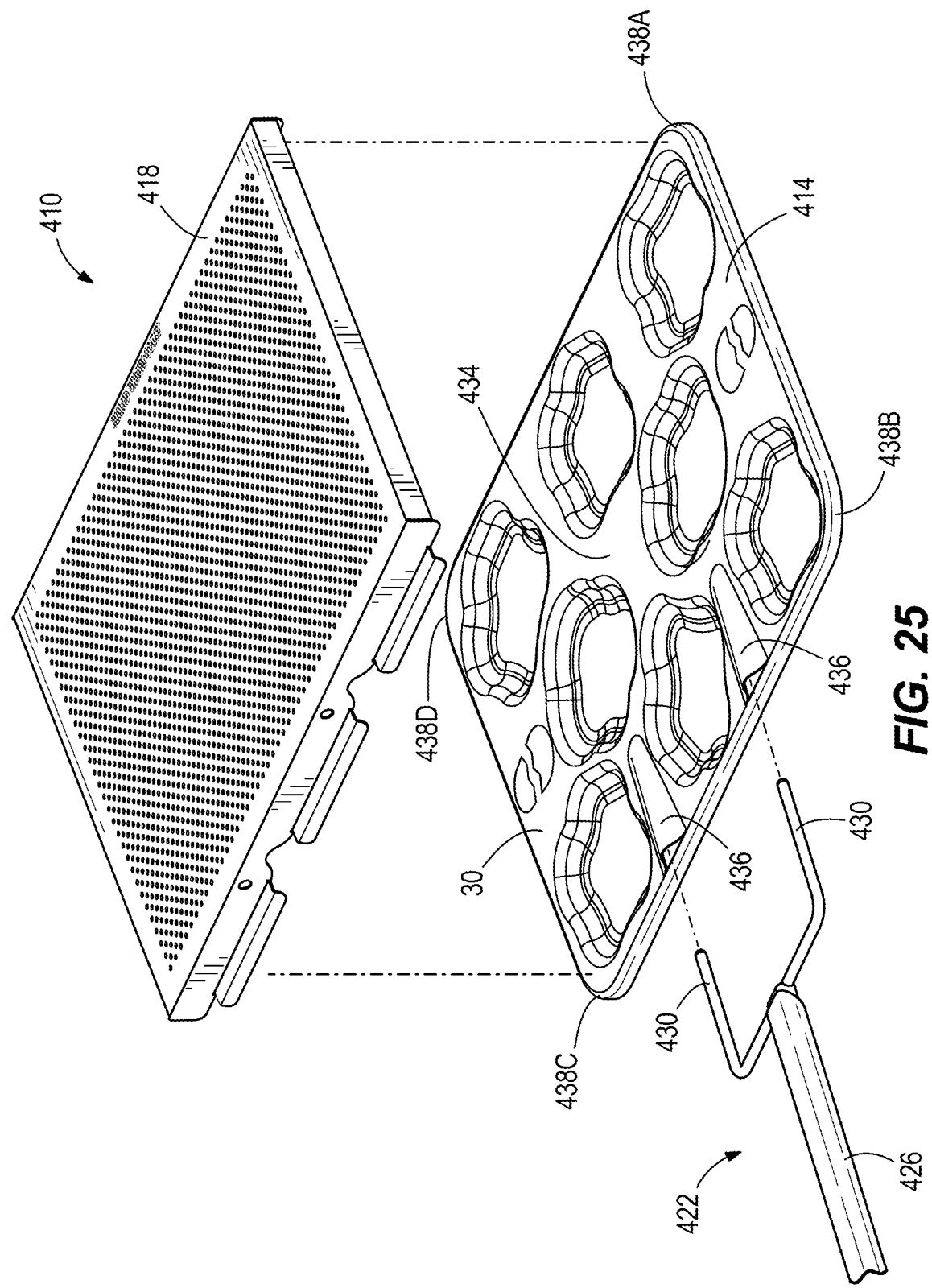
FIG. 25 is an exploded view of the tray assembly of FIG. 24.

FIGS. 24 and 25 illustrate a tray assembly 410 according to another embodiment. The tray assembly 410 is similar to the tray assembly 210 with like features being represented by like reference numerals. The tray assembly 410 includes a tray 414, a diffuser plate 418, and a handle 422 with an elongated shaft 426 and prongs 430.

Referring to FIG. 25, the tray 414 is similar to the tray 214 but includes rounded corners 438A-D. In some embodiments, the tray 414 may include indicia. The indicia may illustrate handling instructions for the tray 414. For example, the indicia may illustrate to a user to hand wash the tray 414 only. In other embodiments, the indicia may indicate other handling instructions, such as, indicating to a user to use caution or care when handling the tray 414. In addition, the tray 414 includes eyelets 436 that are elongated further along the top side 30 of the tray 414 when compared to the eyelets 238 of FIG. 14. Although the tray 414 is not illustrated with the slots 234 of FIG. 14, in some embodiments, the tray 414 may include slots for the same purpose.

Figure 26:
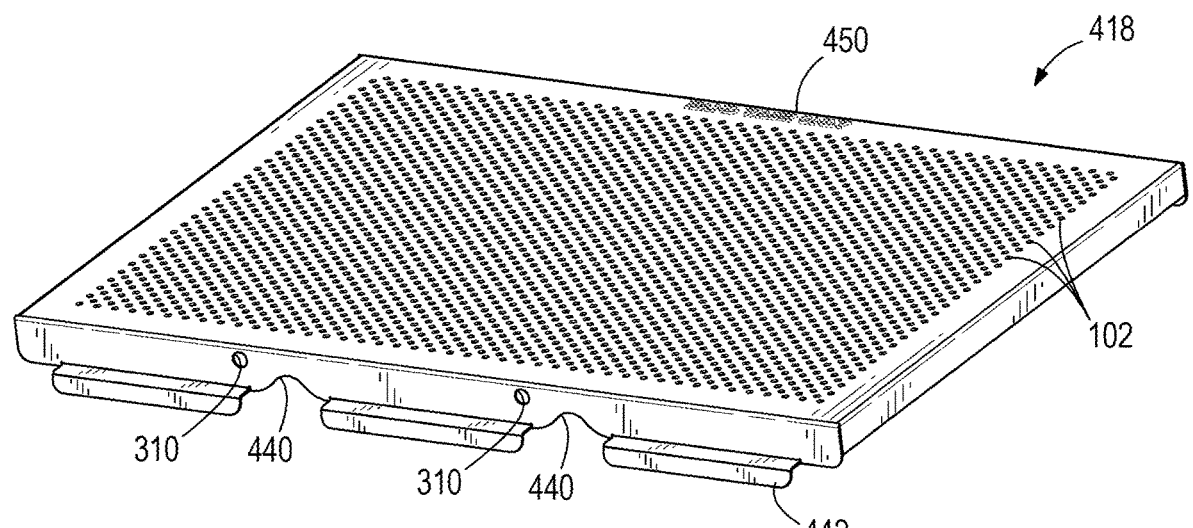
FIG. 26 is a front perspective view of a diffuser for the tray assembly of FIG. 12.
Figure 27:
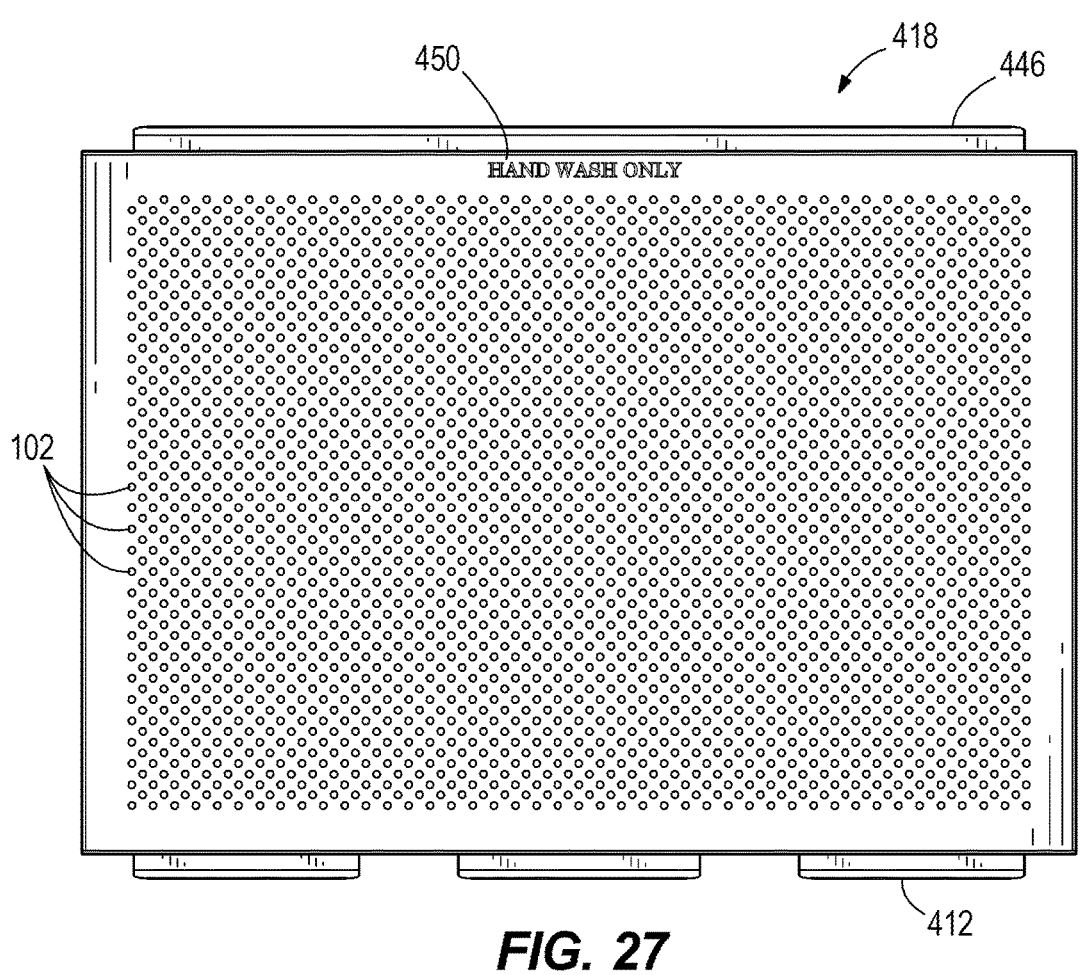
FIG. 27 is a top view of the diffuser of FIG. 26
Figure 28:
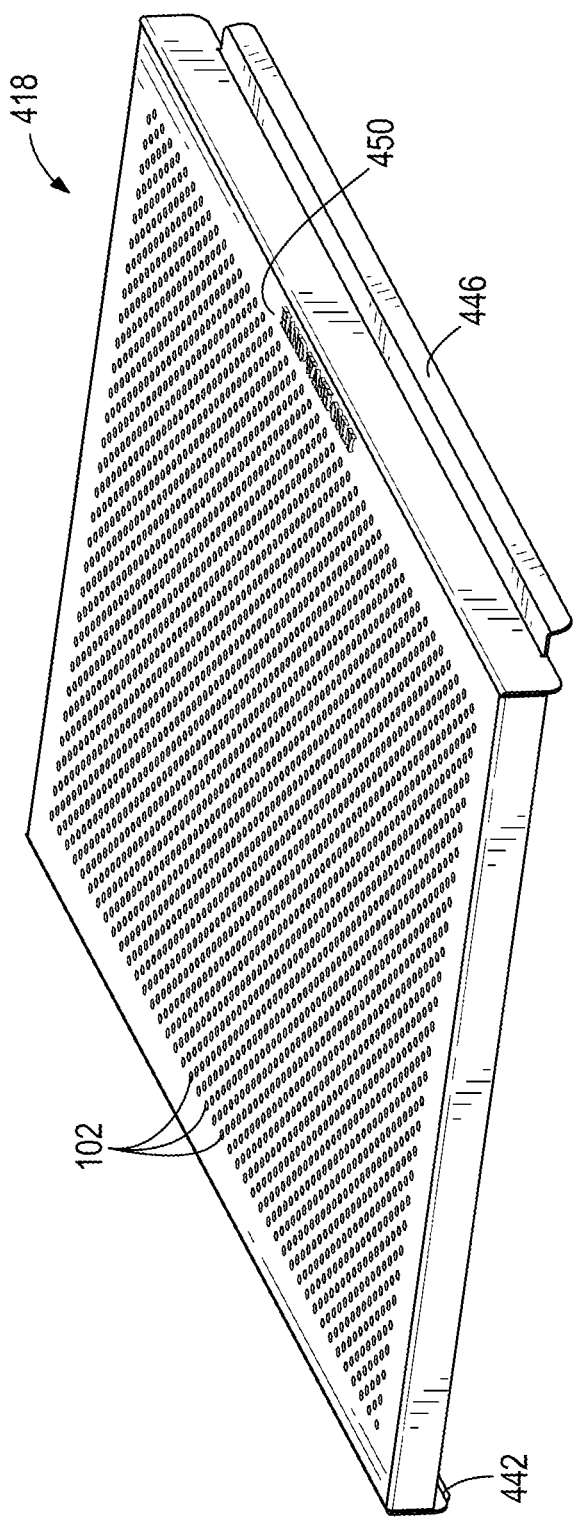
FIG. 28 is a rear perspective view of the diffuser of FIG. 26.
Figure 29:
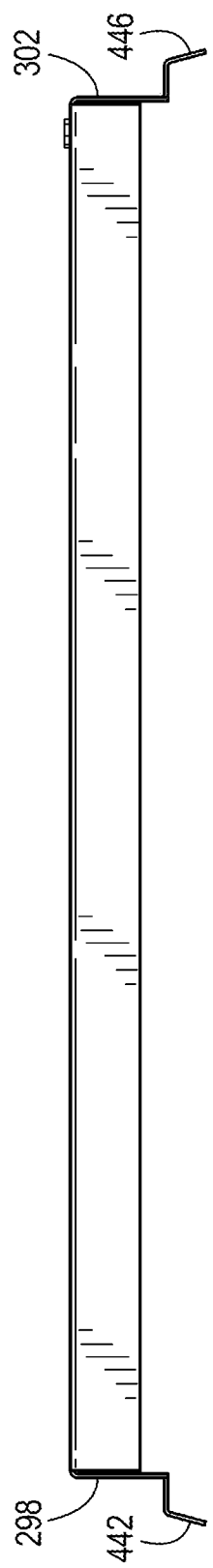
FIG. 29 is a side view of the diffuser of FIG. 26.

With reference to FIGS. 26-28, the diffuser plate 418 is similar to the diffuser plate 218 and includes apertures 102, slots 440, and the pair of apertures 310. As shown in FIG. 29, the diffuser plate 418 further includes a front L-shaped flange 442 extending from the front flange 298 and a rear L-shaped flange 446 extending from the rear flange 302. The combination of the front flange 298 and the flange 442 may also be described as a Z-shaped flange, as could the combination of the rear flange 302 and flange 446. In the illustrated embodiment, the front L-shaped flange 442 is separated into three discrete flanges separated by the slots 440. In other embodiments, the front L-shaped flange 442 may include more than three discrete flanges or fewer than three discrete flanges. For example, the diffuser may include three slots 440 and the front L-shaped flange 442 may include four discrete flanges each separated by a slot 440. The front and back L-shaped flanges 442, 446 help position the diffuser 418 on the tray 414 while using the tray assembly 410. During operation, the flanges 442, 446 rest on the tray 414.

In addition, the diffuser 418 may include indicia 450 positioned on the top side of the diffuser 418 adjacent the side edge 90B. The indicia 450 illustrates handling instructions for the diffuser 418. For example, in the illustrated embodiment, the indicia 450 illustrates to a user to hand wash the diffuser 418 only. In other embodiments, the indicia 450 may indicate other handling instructions, such as, indicating to a user to use caution or care when handling the diffuser 418.

The tray assembly 410 with handle 422 may be used in a similar manner as described above with respect to the tray assembly 210.

The aforementioned trays, diffusers, and/or handles may be made out of a metal such as stainless steel, aluminum, or some combination thereof. In addition, the trays, diffusers, and/or handles may include a rust preventative coating such as black or blue anodized type II.

Various features and advantages of the disclosure are set forth in the following claims.

The invention claimed is:

1. A tray assembly comprising:
a tray including a planar top side, an underside opposite the top side, and a plurality of protrusions extending from the underside, each protrusion defining a recess with an opening in the planar top side and having a bottom wall and a contoured cooking surface connecting the bottom wall to the planar top side, wherein the contoured cooking surface defines a plurality of concave and convex cooking surface portions; and
a diffuser in the form of a plate with a plurality of apertures therethrough, the diffuser couplable to the tray and positionable a spaced distance above the planar top side of the tray, wherein the plurality of apertures is spread across more than half of the opening for each recess, and
wherein the contoured surface presents an operable cooking ledge parallel to the planar top side between a concave cooking surface portion and a convex cooking surface portion.

2. The tray assembly of claim 1, further comprising a handle configured to lift the tray assembly.

3. The tray assembly of claim 2, wherein the top side of the tray includes a pair of half shears each forming an opening configured to receive a portion of the handle.

4. The tray assembly of claim 3, wherein the diffuser includes a pair of arcuate slots in a flange portion thereof arranged such that upon assembly of the diffuser to the tray each slot overlies the opening of an associated half shear.

5. The tray assembly of claim 4, wherein the diffuser includes a pair of apertures in the flange portion, each aperture spaced an equal distance from an associated arcuate slot of the pair of arcuate slots.

6. The tray assembly of claim 1, wherein the plurality of apertures are arranged in offset rows and columns.

7. The tray assembly of claim 1, wherein the diffuser is pivotably coupled to the tray.

8. The tray assembly of claim 7, wherein the diffuser is pivotable between a first closed configuration in which the diffuser is spaced above the tray for placement within an oven, and a second open configuration that allows access to the recesses.

9. The tray assembly of claim 1, wherein the tray includes slots on the top side and the diffuser includes tabs that correspond to the slots, and wherein the tabs are configured to be positioned in the slots to secure the diffuser to the tray.

10. A tray comprising:
a generally planar top side; and
an underside opposite the top side,
wherein a plurality of recesses are formed in the planar top side and define corresponding protrusions extending from the underside, each protrusion including a planar bottom wall and a sidewall extending between the planar top side and the planar bottom wall,
wherein the sidewall includes a first portion extending from the planar top side towards the planar bottom wall, a second portion angled relative to the first portion in a direction from the top side to the planar bottom wall and extending from the first portion towards the planar bottom wall, and a third portion between the second portion and the planar bottom wall and angled relative to each of the second portion and the planar bottom wall in a direction from the top side to the planar bottom wall, and
wherein the second portion includes an operable cooking ledge oriented parallel to the planar top side.

11. The tray of claim 10, wherein the cooking ledge is positioned on the sidewall between 0.075 inches and 0.15 inches from the bottom wall.

12. A tray comprising:
a top side including a planar top surface;

an underside opposite the top side;
a plurality of containment regions, each containment region having an opening at the planar top surface, a bottom wall, and a contoured surface connecting the planar top surface to the bottom wall, wherein the planar top surface extends between the plurality of containment regions, and wherein the contoured surface of each containment region includes an operable cooking ledge nearer the bottom wall than the opening; and
a diffuser in the form of a plate with a plurality of apertures therethrough, the diffuser couplable to the tray and positionable a spaced distance above the planar top surface of the tray,
wherein the plurality of apertures is configured to spread across at least a central portion of each containment region opening to diffuse heated air evenly through each containment region opening.

13. The tray of claim 12, wherein the operable cooking ledge includes a surface parallel to the planar top surface.

14. The tray of claim 12, wherein each containment region includes a lip connecting the top side to the contoured surface, the lip defining a non-circular outer perimeter of the opening.

15. The tray of claim 12, wherein each containment region has a volume configured such that during operation the volume of egg product fills up the recesses to a level no more than 0.10 inches below the planar top surface.

* * * * *